US006710921B2

(12) United States Patent
Hansen et al.

(10) Patent No.: US 6,710,921 B2
(45) Date of Patent: *Mar. 23, 2004

(54) POLARIZER APPARATUS FOR PRODUCING A GENERALLY POLARIZED BEAM OF LIGHT

(75) Inventors: Douglas P. Hansen, Orem, UT (US); John Gunther, Torrance, CA (US)

(73) Assignee: Moxtek, Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/050,301

(22) Filed: Jan. 15, 2002

(65) Prior Publication Data

US 2002/0101659 A1 Aug. 1, 2002

Related U.S. Application Data

(62) Division of application No. 09/603,249, filed on Jun. 26, 2000, now Pat. No. 6,452,724, which is a division of application No. 09/078,613, filed on May 14, 1998, now Pat. No. 6,108,131.

(51) Int. Cl.[7] .................... G02B 5/30; G02B 27/28; F21V 9/14
(52) U.S. Cl. ................... 359/486; 359/487; 359/495; 359/496; 359/497; 362/19; 353/20
(58) Field of Search ................ 359/352, 486, 359/487, 495; 353/20; 362/19

(56) References Cited

U.S. PATENT DOCUMENTS

| 2,224,214 A | 12/1940 | Brown |
| 2,403,731 A | 7/1946 | MacNeille |
| 2,748,659 A | 6/1956 | Geffcken et al. |
| 2,887,566 A | 5/1959 | Marks |
| 3,536,373 A | * 10/1970 | Bird et al. ................ 359/486 |
| 3,566,099 A | 2/1971 | Makas |
| 3,627,431 A | 12/1971 | Komarniski |
| 3,631,288 A | 12/1971 | Rogers |
| 3,653,741 A | * 4/1972 | Marks ................ 359/486 |
| 3,731,986 A | 5/1973 | Fergason |

(List continued on next page.)

FOREIGN PATENT DOCUMENTS

| DE | 296391 | 2/1950 |
| EP | 0317910 A1 | 11/1987 |
| EP | 0349144 B1 | 6/1988 |
| EP | 0349309 B1 | 6/1988 |
| EP | 0336334 B1 | 8/1988 |

(List continued on next page.)

OTHER PUBLICATIONS

Nordin et al., "Microplanarizer array for infrared imaging polarimetry", J. Op. Soc. Am. A. vol. 16 No. 5/May 1999.

(List continued on next page.)

Primary Examiner—Ricky D. Shafer
(74) Attorney, Agent, or Firm—Thorpe North & Western LLP

(57) ABSTRACT

A polarizing device has an arrangement of generally parallel elements disposed in an unpolarized source light beam for transmitting polarizations perpendicular to the elements and reflecting polarizations parallel to the elements. The elements may be disposed at substantially any incidence angle and may reflect the reflected beam at substantially any angle. The elements may be disposed on a substrate or embedded in a substrate. The elements may be disposed in a curved layer. The substrate may also have a curved surface. A polarizer apparatus may also have a mirror or the like for redirecting or recapturing the transmitted or reflected beam so they have similar directions or are directed to a common area. The device may also have a wave plate or the like for changing the polarization of the transmitted or reflected beams so they have the same polarization.

23 Claims, 7 Drawing Sheets

U.S. PATENT DOCUMENTS

| | | |
|---|---|---|
| 3,857,627 A | 12/1974 | Harsch |
| 3,857,628 A | 12/1974 | Strong |
| 3,876,285 A | 4/1975 | Schwarzmüller |
| 3,877,789 A * | 4/1975 | Marie ........................ 359/352 |
| 3,912,369 A | 10/1975 | Kashnow |
| 3,969,545 A | 7/1976 | Slocum |
| 4,025,164 A | 5/1977 | Doriguzzi et al. |
| 4,025,688 A | 5/1977 | Nagy et al. |
| 4,049,944 A | 9/1977 | Garvin et al. |
| 4,073,571 A | 2/1978 | Grinberg et al. |
| 4,104,598 A | 8/1978 | Abrams |
| 4,181,756 A | 1/1980 | Fergason |
| 4,220,705 A | 9/1980 | Sugibuchi et al. |
| 4,221,464 A | 9/1980 | Pedinoff et al. |
| 4,268,127 A | 5/1981 | Oshima et al. |
| 4,289,381 A | 9/1981 | Garvin et al. |
| 4,294,119 A | 10/1981 | Soldner |
| 4,456,515 A | 6/1984 | Krueger et al. |
| 4,466,704 A | 8/1984 | Schuler et al. |
| 4,492,432 A | 1/1985 | Kaufmann et al. |
| 4,512,638 A | 4/1985 | Sriram et al. |
| 4,514,479 A | 4/1985 | Ferrante |
| 4,515,441 A | 5/1985 | Wentz |
| 4,515,443 A * | 5/1985 | Bly |
| 4,560,599 A | 12/1985 | Regan |
| 4,679,910 A | 7/1987 | Efron et al. |
| 4,688,897 A | 8/1987 | Grinberg et al. |
| 4,711,530 A | 12/1987 | Nakanowatari et al. |
| 4,724,436 A * | 2/1988 | Johansen et al. ........... 359/486 |
| 4,743,092 A | 5/1988 | Pistor |
| 4,743,093 A | 5/1988 | Oinen |
| 4,759,611 A | 7/1988 | Downey, Jr. |
| 4,799,776 A | 1/1989 | Yamazaki et al. |
| 4,818,076 A | 4/1989 | Heppke et al. |
| 4,840,757 A | 6/1989 | Blenkhorn |
| 4,865,670 A | 9/1989 | Marks |
| 4,895,769 A | 1/1990 | Land et al. |
| 4,913,529 A | 4/1990 | Goldenberg et al. |
| 4,939,526 A * | 7/1990 | Tsuda |
| 4,946,231 A | 8/1990 | Pistor |
| 4,966,438 A | 10/1990 | Mouchart et al. |
| 4,991,937 A | 2/1991 | Urino |
| 5,029,988 A | 7/1991 | Urino |
| 5,061,050 A | 10/1991 | Ogura |
| 5,087,985 A | 2/1992 | Kitaura et al. |
| 5,113,285 A | 5/1992 | Franklin et al. |
| 5,122,887 A | 6/1992 | Mathewson |
| 5,122,907 A | 6/1992 | Slocum |
| 5,139,340 A | 8/1992 | Okumura |
| 5,157,526 A | 10/1992 | Kondo et al. |
| 5,177,635 A | 1/1993 | Keilmann |
| 5,204,765 A | 4/1993 | Mitsui et al. |
| 5,216,539 A | 6/1993 | Boher et al. |
| 5,235,443 A | 8/1993 | Barnik et al. |
| 5,235,449 A | 8/1993 | Imazeki et al. |
| 5,245,471 A | 9/1993 | Iwatsuka et al. |
| 5,279,689 A | 1/1994 | Shvartsman |
| 5,295,009 A | 3/1994 | Barnik et al. |
| 5,305,143 A | 4/1994 | Taga et al. |
| 5,325,218 A | 6/1994 | Willett et al. |
| 5,333,072 A | 7/1994 | Willett |
| 5,349,192 A | 9/1994 | Mackay |
| 5,357,370 A | 10/1994 | Miyatake et al. |
| 5,383,053 A | 1/1995 | Hegg et al. |
| 5,387,953 A * | 2/1995 | Minoura et al. |
| 5,422,756 A | 6/1995 | Weber |
| 5,436,761 A | 7/1995 | Kamon |
| 5,455,589 A * | 10/1995 | Huguenin et al. |
| 5,466,319 A | 11/1995 | Zager et al. |
| 5,485,499 A | 1/1996 | Pew et al. |
| 5,486,935 A | 1/1996 | Kalmanash |
| 5,486,949 A | 1/1996 | Schrenk et al. |
| 5,490,003 A | 2/1996 | Van Sprang |
| 5,506,704 A | 4/1996 | Broer et al. |
| 5,508,830 A | 4/1996 | Imoto et al. |
| 5,513,023 A | 4/1996 | Fritz et al. |
| 5,513,035 A | 4/1996 | Miyatake et al. |
| 5,517,356 A | 5/1996 | Araujo et al. |
| 5,557,343 A | 9/1996 | Yamagishi |
| 5,559,634 A | 9/1996 | Weber |
| 5,570,215 A | 10/1996 | Omae et al. |
| 5,574,580 A | 11/1996 | Ansley |
| 5,579,138 A | 11/1996 | Sannohe et al. |
| 5,594,561 A | 1/1997 | Blanchard |
| 5,609,939 A | 3/1997 | Petersen et al. |
| 5,612,820 A | 3/1997 | Schrenk et al. |
| 5,619,356 A | 4/1997 | Kozo et al. |
| 5,626,408 A | 5/1997 | Heynderickx et al. |
| 5,658,060 A | 8/1997 | Dove |
| 5,686,979 A | 11/1997 | Weber et al. |
| 5,748,368 A | 5/1998 | Tamada et al. |
| 5,748,369 A | 5/1998 | Yokota |
| 5,798,819 A | 8/1998 | Hattori et al. |
| 5,826,960 A | 10/1998 | Gotoh et al. |
| 5,833,360 A | 11/1998 | Knox et al. |
| 5,838,403 A | 11/1998 | Jannson et al. |
| 5,841,494 A | 11/1998 | Hall |
| 5,890,095 A * | 3/1999 | Barbour et al. |
| 6,108,131 A * | 8/2000 | Hansen et al. ............... 359/486 |
| 6,208,463 B1 * | 3/2001 | Hansen et al. ............... 359/486 |
| 6,452,724 B1 * | 9/2002 | Hansen et al. ............... 359/486 |

FOREIGN PATENT DOCUMENTS

| | | | |
|---|---|---|---|
| EP | 0357946 B1 | 8/1988 | |
| EP | 0407830 A2 | 7/1989 | |
| EP | 407830 B1 | 7/1989 | |
| EP | 416157 A1 | 9/1989 | |
| EP | 0488544 A1 | 11/1990 | |
| EP | 0507445 A2 | 3/1991 | |
| EP | 0518111 A1 | 5/1991 | |
| EP | 0588937 B1 | 6/1991 | |
| EP | 0521591 B1 | 7/1991 | |
| EP | 0543061 A1 | 11/1991 | |
| EP | 0606940 A2 | 1/1993 | |
| EP | 0634674 A2 | 6/1993 | |
| EP | 0670506 A1 | 9/1993 | |
| EP | 0744634 A2 | 5/1995 | |
| JP | 0084502 | 8/1989 | |
| SU | 1283685 | * 1/1987 | .................. 359/486 |
| SU | 1781659 | * 12/1992 | .................. 359/486 |

OTHER PUBLICATIONS

Pitts, "Thin Elemental Standards on Polyamide Films: A New Means of Calibrating a Porton Induced X–Ray Emission (PIXE) System", Proceedings—NCUR VII (1993) Brigham Young University, Mangelson, Faculty Advisor.

Li Li and J.A. Dobrowski, "Visible broadband, wide–angle, thin–film multilayer polarizing beam splitter," Applied Optics May 1, 1996, vol. 35, No. 13, pp. 2221–2224.

N.M. Ceglio, Invited Review "Revolution in X–Ray Optics", J. X–Ray Science & Tech 1, 7–78 (1989).

Dainty, et al, "Measurements of light scattering by characterized random rough surface", Waves in Random Media 3 (1991); pp S29–S39.

DeSanto & Wombell, "Rough surgace scattering", Waves in Random Media 1 (1991); pp. S41–S56.

Lavin, "Specular Reflection", Monographs on App. Opt. No. 2: pp26–35.

\* cited by examiner

POLARIZER APPARATUS FOR PRODUCING A GENERALLY POLARIZED BEAM OF LIGHT

This is a Division of application Ser. No. 09/603,249, filed Jun. 26, 2000, now U.S. Pat. No. 6,452,724, which is a Division of application Ser. No. 09/078,613, filed May 14, 1998, now U.S. Pat. No. 6,108,131.

BACKGROUND OF THE INVENTION

1. Field of the Invention

The present invention relates to optical systems within the visible and near visible spectrums which include a polarizer apparatus for producing a generally polarized light beam from a generally unpolarized source light beam. More particularly, the present invention relates to such optical systems comprised of a plurality of optical elements, one of which consists of a polarizer having a generally parallel arrangement of elongated elements disposed in the source light beam for interacting with the electromagnetic waves of the source light beam to generally (i) transmit or pass light having a polarization oriented perpendicular to the length of the elements, and (ii) reflect light having a polarization oriented parallel with the length of the elements.

2. Prior Art

Polarized light is utilized in various applications such as, for example, liquid crystal displays (LCDs) and projection systems. Liquid crystal displays are commonly used for displays in laptop computers and other information displaying devices such as watches and calculators. Liquid crystal projectors are also used to display information, but project the information or images onto a distant screen. Such projectors usually have their own, powerful light source.

The liquid crystal display devices within these projectors employ polarizer devices in combination with the properties of the liquid crystal elements to selectively transmit or absorb light to produce a pattern of light and dark pixels, creating the desired image. The ability to turn light on or off leads to their common designation as a liquid crystal light valve. They function by taking advantage of the liquid crystal material's ability to rotate the polarization of light when organized and aligned appropriately, and its characteristic that this proper alignment can be altered by an external electric field.

Typically, two polarizer devices are employed, one on each side of the liquid crystal elements, creating a light valve assembly. The purposes of the polarizer devices are to present polarized light to the liquid crystal elements and then to analyze the light passed by the liquid crystal elements and block light of the undesired polarization.

It should be understood that the first polarizer device that presents light to the liquid crystal elements need not be immediately adjacent to the liquid crystal elements. However, it is required that the light arriving at the liquid crystal elements be highly plane polarized in order to present a quality, high-contrast image. Therefore, a polarized light beam generated by a polarizer device some distance from the liquid crystal elements could function as this first polarizer device. Of course, there are other applications for polarized light beams, such as are found in scientific instruments and certain types of illumination systems.

The term "polarized" or "polarized light" refers to a beam of light generally having a single linear, or planar, polarization defined by similarly oriented electromagnetic waves. A natural beam of light, on the other hand, is generally unpolarized, or has a number of planes of polarization defined by the electromagnetic waves emitted by the light source. This natural, or unpolarized, light may be characterized as being composed of two, orthogonal, linear (plane) polarizations.

The electromagnetic waves of a particular polarization, or orientation, may be separated out from the unpolarized source, which contains both the particular polarization and the orthogonal polarization. Devices that separate out a particular polarization are called polarizers and may be used to obtain a beam of light generally having a single polarization, or linearly polarized light.

The concepts of polarized light and certain polarizing devices have existed for over a century. Surprisingly, the most modern and advanced applications of polarized light still employ polarizers that are fundamentally unchanged from those of over 30 years ago. This situation is surprising because the fundamental physical mechanisms by which these polarizers function do not provide ideal polarizers for most applications. The resulting performance limitations seriously constrain optical system design flexibility, optical efficiency, system cost, and over-all performance. The consequences of these limitations have led to numerous attempts to improve polarizer performance in ways that typically compromise performance in one or more characteristics, in order to obtain less restrictive performance in another characteristic.

Examination of the history of polarizers and their use in optical systems to produce polarized light beams shows that the polarizer component is the primary and most significant reason why the use of polarized light beams exhibits one or more of the following characteristics: inefficiency, color-dependent performance variations, a requirement for highly collimated light, and complicated optical systems.

Probably the first polarizer known was a birefringent polarizer formed from a calcite crystal. Birefringent polarizers can now be made from many crystals and also certain stretched polymers. Birefringent polarizers are formed from materials that have a different optical index in one direction compared to another, though the degree of difference in the optical index will vary with the color of the light. This differing optical index can be used to separate beams of one linear polarization from another, though this separation typically consists of a small angular deviation. This narrow separation may require the use of complicated optics. It may also require that the light travel through a significant amount of material or over an extended optical path, leading to a bulky optical element or design. Finally, the narrow separation makes it difficult to use both polarizations, meaning half of the light is usually discarded or wasted through absorption or other means.

Use of a birefringent polarizer is typically characterized by inefficiency, color-dependent performance variations, a requirement for highly collimated light, and complicated optical systems. The bulky optics and extended optical path impose additional performance and design penalties. For these reasons, birefringent polarizers are not commonly used in optical systems such as image projectors.

Another type of polarizer, developed in the 1930s and still the primary polarizer used in laptop computer displays, is the dichroic polarizer. A dichroic polarizer is a polarizer device that absorbs one polarization and passes the other. Many types of dichroic polarizers have been developed, but the most common type consists of a polymer sheet that has been stretched to orient its molecules and then treated with iodine and/or other materials so that the oriented molecules absorb any polarization of one orientation.

The most significant problem with dichroic polarizers is their absorption of light. Typical stretched polymer sheet polarizers absorb essentially all of one polarization and 15% or more of the desired or passed polarization, leading to an inefficient use of light. All polymer polarizers have other problems as well, such as their low tolerance for heat and sensitivity to photon induced chemical changes that cause the material to yellow or become brittle with use and age. These problems become increasingly critical as the brightness of the optical system is increased. The inherent inefficiency of all dichroic polarizers combined with the environmental (heat and light) sensitivity of the most common polymer sheet polarizers leaves much to be desired.

Still another fundamental polarizer technology is the thin-film polarizer. It uses the Brewster's effect in which light striking the surface of glass or another medium at the Brewster's angle (near 45 degrees) is converted into two polarized beams, one transmitted and the other reflected. Polarization of light by use of the Brewster's angle can only be accomplished effectively over a very narrow angular range. An example of this type of polarizer is U.S. Pat. No. 2,403,731, issued Jul. 9, 1946, to MacNeille. MacNeille included a number of layers that help broaden the acceptance angle range for this type of polarizer, though the acceptance angle range is still limited to a few degrees in most devices. MacNeille prisms are typically manufactured with the polarizing thin films disposed between the large faces of two wedges, forming a cube with the films diagonally disposed in the cube. Thus, the width and depth of the cube are equivalent.

MacNeille prisms also suffer from color-dependent performance because the Brewster's angle will vary somewhat with color, reducing the effectiveness of the polarizer for broad band visible light applications. A further limitation of MacNeille polarizers and related polarizer devices is that the polarization that is not passed is reflected to the side at right angles to the optical axis of the system. This is an inconvenient location for the unused light and significantly restricts the utility of these types of polarizers. Finally, these types of polarizers become very bulky in order to achieve a reasonable physical aperture because the depth of the MacNeille polarizer increases as the width, or aperture, increases due to the angular disposition of the film in the cube. Alternatively, a less bulky, or less deep, MacNeille polarizer may be formed by numerous, smaller cubes placed side-by-side to span a wider area, or create a wider physical aperture. This, however, requires a complex assembly that is difficult and costly to manufacture.

Having failed to improve the limitations of these traditional polarizers, efforts were turned in the 1960s to the field of cholesteric polarizers. Rather than directly separating the two linear polarizations as before, cholesteric polarizers create circularly polarized light. Cholesteric polarizers use special materials and chemicals with a molecular structure that interacts with light to produce circular polarization. A cholesteric polarizer will reflect light of one circular polarization and transmit the orthogonal circular polarization.

One problem with cholesteric polarizers is that circularly polarized light is not generally useful and must be converted to linearly polarized light. Another problem with these polarizers is that they do not work well at larger angles, or a broad range of incident angles. Another problem is that cholesteric polarizers are not broadband, or have a limited optical bandwidth. The efforts directed to developing cholesteric polarizers are indicative of the weaknesses in traditional polarizers and the magnitude of the effort invested in seeking improvements.

In the last ten years, a polarizer device has been developed in which stretched polymer sheets are made birefringent. See for example U.S. Pat. No. 5,612,820. These stretched sheets reflect one polarization and pass the other. One problem with this type of polarizer is its low extinction ratio of approximately 15. While useful for some applications, this extinction ratio is not sufficient for imaging applications without a secondary polarizer, and the fundamental physics of this device make it doubtful that this characteristic can be significantly improved. This type of polarizer also suffers from the environmental problems mentioned earlier.

The problems with conventional polarizer devices, some of which have been discussed above, have serious implications in the applications of polarized light. For example, poor light efficiency is undesirable in many applications, such as image projection, where power is expensive or its waste has expensive and undesirable consequences. To begin with, the production of light itself is an inefficient process. The most efficient conversion of electrical energy into light energy occurs in fluorescent lights, which have an efficiency of about 40%. Fluorescent lights, however, are not optically bright sources. Bright sources, such as arc lamps and metal halide lamps, on the other hand, are even less efficient in producing light, having an efficiency under 10%. In addition, bright sources, such as arc lamps, commonly require expensive power regulators. Because of the inefficiencies inherent in simply creating the light energy, it is important to make efficient use of the light produced.

Since unpolarized natural light consists of two orthogonal linear polarizations, the fundamental light polarization process can only provide 50% of the light produced in the desired polarization. Any polarizer that absorbs, or otherwise renders the undesired polarization unusable imposes a significant performance penalty on the optical system. Hence, it is desirable to have a polarizer that enables the undesired polarization to be used in order to increase the energy efficiency.

In addition to the cost of the power to create the light, inefficient polarizers also have other expensive and undesirable consequences. For example, an inefficient polarizer requires that excess light be produced for a given application because so much light is discarded. A more powerful light source generates more heat, weight, and size. Fans are required to dissipate the heat, which also require power, add weight, add size, add expense, add noise and create vibration. Thus, inefficient polarizers lead to systems that are expensive to make and use, heavy, bulky, and noisy. One of the main challenges in any optical design is to make efficient use of the light available, a goal made particularly difficult by traditional polarizers. A useful measure of this efficiency is the luminous efficiency (also termed luminous efficacy), which is the ratio of the power of the light delivered in the image to the power provided to the light source.

There are other important optical limitations besides absorbing or wasting light energy. A critical parameter is the range of incident angles light can take and still interact properly with the polarizer device to be correctly polarized. This property can be discussed or described by a number of terms, such as the numerical aperture, the cone angle, etendue, or optical speed. All of these terms discuss in various contexts in optical design and theory the breadth of angles that an optical component can accept. For the purposes of discussion, we will refer to the acceptance angle, meaning the largest angle from the local normal to the polarizer device that light can have and still be properly, or correctly polarized by the device.

For an image projection system, or other applications of a polarized light beam, a brighter beam is always desirable.

The brightness of the polarized light beam is determined by several things. Of course, the first factor is the light source itself. A smaller, more powerful source will provide a brighter beam, all else being equal. The other critical factor is the ability of the optical system to gather light from the source and direct it into the useful beam. For natural, unpolarized light, this ability depends fundamentally on the acceptance angle of the optical system. A system that employs a polarizer with narrow or limited acceptance angles cannot gather as much light from a given divergent source as a system that employs a polarizer with broader or wider acceptance angles. Other advantages of wide acceptance angles include the potential for a more compact optical system, less expensive and lower power light sources since more light can be used from a given source, and other related advantages.

Another critical advantage of wide acceptance angles is that it provides significant freedom in the optical design. For example, a polarizer device with narrow acceptance angles must be placed within the optical system within a limited range of positions and angles relative to the optical axis. The consequences of this limitation can be seen in the case of a MacNeille prism, where recapture of the rejected light must occur off to the side of the optical system. This location is not convenient, it increases the size and width of the entire system, and additional components (that are otherwise unnecessary) are required to redirect the light into the useful polarized beam. All these limitations, of course, affect cost and utility of the optical system. On the other hand, a wider acceptance angle would allow the polarizer device to be placed and positioned such that the rejected light is placed where it is most convenient for the design of the optical system, offering the optical engineer choices and possibilities that have not been available before.

These two important characteristics, non-absorption and large acceptance angle, are mutually exclusive in traditional polarizers. Polarizers with large acceptance angles permit more design flexibility because the polarizer need not be positioned and oriented within a narrow range of acceptable incident angles with respect to the source light. In addition, polarizers with large acceptance angles are able to use more divergent source light. Non-absorbing polarizers, on the other hand, are able to be more efficient because the rejected polarization may be recovered. Both of these characteristics, however, are necessary for a polarizer device that is both efficient and flexible.

Great efforts have been directed towards improving the traditional types of polarizers for better performance in the production of polarized beams of light. This effort is evidenced by the numerous patents filed, mostly for cholesteric type polarizers and MacNeille prism type polarizers. See U.S. Pat. Nos. 5,153,752; 5,200,843; 5,283,600; 5,295,009; 5,357,370; 5,422,756; 5,555,186; 5,570,215; 5,579,138; 5,626,408; and 5,653,520. In most instances, the efficiency of these devices is enhanced by either returning the rejected plane of polarization to the light source or by rotating the plane of polarization and redirecting it. Some systems even separate the two polarizations, generate a portion of the image in each polarization, and carefully combine the final image from each polarization. Common terms used to describe optical systems that recover or make use of both polarizations in the light beam include polarization saving, polarization recovery, and polarization recycling.

However, even though there has been an extraordinary number of patents granted for polarizer devices that implement various schemes for polarization recovery, there are only a few commercial devices implementing it on the market today. These devices are represented by U.S. Pat. No. 5,555,186. The first device introduced uses MacNeille prisms and a careful and complex optical design to deal with the limitations discussed above. Essentially, this device incorporates a number of MacNeille prisms arranged in an array with spaces formed in between the prisms. Light from the source is directed towards the prisms by a multi-lens optical array. One polarization is passed directly through the prisms while the other polarization is directed sideways towards the spaces in between the prisms. Mirrors disposed in these spaces redirect the other polarization again into the useful beam. Waveplates, also disposed in the spaces, rotate the other polarization so that it is the same as the passed polarization. This device suffers from the same problems as those for the MacNeille prisms discussed above, including restricting the other polarization to an orthogonal direction to the optical axis, or out the side of the prism. In addition, the acceptance angle is narrow, restricting the choices for the light source to very small, bright arc lamps that are expensive and cannot be designed for outputs above a few hundred watts. Another problem is that the precise optics can become misaligned, affecting its performance.

This device is illustrative of the extent to which traditional polarizers have been arranged and manipulated in order to improve their efficiency. In addition, this device is illustrative of the design constraints placed on the system due to the limitations of the polarizer. For example, the narrow range of incidence angles accepted by the MacNeille prisms require that the source light be substantially non-divergent and that the source light and polarizer be specifically positioned and oriented with respect to each other. Furthermore, the rejected polarization is directed substantially orthogonal to the optical axis, dictating the location and orientation of other optical elements. In this case, the mirrors are required to be disposed in spaces between the prisms as part of a complex assembly to recapture the rejected polarization.

Another less complicated, and less elegant, method and device for improving the efficiency of the polarizer uses a diffuse reflector. This concept is currently used in flat panel displays, such as lap top computers. The rejected polarization is reflected backwards onto the diffuse reflector that scatters the light and confuses the polarization. The light is then redirected at the polarizer. Such an approach cannot have more than a 75% efficiency for a single pass. Furthermore, scattering the light is particularly undesirable in some applications, such as image projection.

As discussed above, efforts at achieving an efficient and flexible polarizer have been largely unsuccessful, despite the lengthy history of visible light polarizers. While some alterations have succeeded in improving the efficiency of traditional devices, they are complicated and impose severe design restrictions. Other polarizers are relatively more flexible, but incapable of efficient polarization. None of the polarizers developed thus far have the necessary characteristics for efficiently and flexibly converting a source light beam into a generally polarized light beam. Some of these characteristics or criterion have received limited discussion thus far, but include the following:

The first desired or necessary characteristic is that the polarizer divide the source beam into two beams of orthogonal polarization with very little loss of light. Thus, for example, the polarizer should not absorb, scatter, or misdirect (poorly focus) one or both of the beams. This is a problem for dichroic polarizers, which absorb one polarization, and systems utilizing diffuse reflectors, which scatter one polarization.

Another desired or necessary characteristic is that the polarizer effectively separate one polarization from the other. In other words, the light in each beam must be well polarized. This is referred to as the extinction ratio, which is the ratio of the amount of light of the desired polarization to the amount of the undesired polarization. The criteria for an acceptable extinction ratio varies by the application. For example, current display applications require at least a ratio of 100:1, but this is rapidly increasing to a ratio of 1000:1. Extinction ratios as low as 3:1 may be useful, but further treatment is required. It should be noted, however, that the extinction ratio affects the contrast of liquid crystal displays and projectors, with higher extinction ratios providing better contrast. In any event, it is desirable to achieve a high extinction ratio with the polarizer itself, thus eliminating any need for further treatment. This is a problem for birefringent and cholesteric polarizers.

Another necessary or desired characteristic is that the polarizer be achromatic over the visible spectrum, or for wavelengths generally between 450 and 700 nm. This applies, of course, to both beams. Achromatic performance means that the polarizer performance not be color dependant, or only work for certain colors. Traditional polarizers typically exhibit color-dependent performance variations. This is a particular problem for cholesteric, birefringent, and MacNeille polarizers.

Another necessary or desired characteristic is that the polarizer be optically fast, or gather a large amount of light. This is a direct result of the polarizer acceptance angle. First, the polarizer should have a wide acceptance angle in order to effectively capture any light that reaches the device. Second, the polarizer should be sufficiently large to capture all the incoming light possible. Therefore, the polarizer should have a large acceptance angle and a large physical aperture. It is not very helpful if the polarizer can be made very large in area but has a narrow acceptance angle, nor is it sufficient if the acceptance angle can be large, but making a large polarizer is prohibitive. This is a problem for birefringent, MacNeille, and cholesteric polarizers because the acceptance angles are generally small, and especially for MacNeille polarizers because making them large leads to a very bulky or complex optic.

Another necessary or desired characteristic is that the polarizer should impose few, if any, constraints on the design of the optical system. It should be possible to position the appropriate optical elements as desired for an efficient system, rather than as the polarizer demands. In addition, the polarizer should not restrict the optical characteristics of the projection system or other device. Furthermore, the polarizer should be able to direct the two orthogonal polarizations in any direction chosen, and with any reasonable degree of focusing. This is perhaps the single most troubling criterion for traditional polarizing beamsplitters to meet. All the above-mentioned conventional polarizers place undesirable restrictions on the orientation of incoming and outgoing light.

Another characteristic is that the polarizer be rugged and difficult to damage. This has several aspects. First, the polarizer should be able to tolerate rapid temperature increases and prolonged high temperature exposure, with a tolerance for several hundred degrees Celsius being very desirable. Second, the polarizer should be able to resist damage through vibration. Third, the performance of the polarizer should not change due to changes in environment, such as heat and handling. Finally, the polarizer should not experience physical degradation caused by photochemistry or other degradation mechanisms triggered by the light passing through it.

Another characteristic is that the polarizer be inexpensive and easy to manufacture. This applies both to the polarizer itself and any related optical elements or substrates, whether manufactured as separate parts or in units that perform more than one optical function.

These characteristics and criterion are not inclusive, but list many of the important factors necessary for efficient and flexible polarization. To date, no polarizer has successfully demonstrated all these characteristics.

Another polarizer device, called a wire grid polarizer, has not been described thus far because it generally has not been used in visible light applications. Essentially, a wire grid polarizer is a planar assembly of evenly-spaced parallel electrical conductors whose length is much larger than their breadth. Waves with a polarization parallel to the conductors are largely reflected while waves of orthogonal polarization are transmitted, or passed through the grid.

It is not surprising that the wire grid polarizer has not been generally applied in visible light applications. Indeed, the historical development of the wire grid polarizer was focused in radio frequency emissions. For example, the wire grid polarizer was first invented in the 1880s and demonstrated with radio waves. The wire grid was made by wrapping a wire around a pair of separated rods. In the 1920s, the wire grid polarizer began to find practical uses in the infrared field. In the 1940s, the wire grid polarizer began to find uses in the radar field. Today, wire grid polarizers are mainly used in the fields of radar, microwaves, and infrared. The wire grid polarizer has been used in these fields because there are few alternative devices, especially for longer wavelengths, and they are fairly easy to fabricate and use, again with the greatest facility for the longer wavelengths.

In addition to separate development paths, the fields in which the wire grid polarizer and the other conventional polarizers were developed are characterized by different goals, perspectives, needs, and applications. Conventional polarizers, as discussed extensively above, were developed exclusively for the visible light and ultra-violet light fields where scientific instruments have used polarized visible and UV light since 1850.

The visible spectrum is characterized by short wavelengths, ranging between 400 to 700 nm (nanometers). In addition, visible light occupies a very narrow spectral range, covering less than one octave, meaning a very large bandwidth is not critical in visible light polarizers. Because of the uniqueness of visible light, it is used in unique applications. Such applications include imaging and information transfer, illumination, and everything we use our eyes for. Therefore, the emphasis in the visible field has been towards efficiency, brightness, contrast, uniform performance for all colors, and has been adapted for the needs of the human eye.

By contrast, the wire grid polarizer was developed for the infrared, microwave, and radar fields. These fields are characterized by large wavelengths, between one micron and ten centimeters (1000 nm to 10,000,000 nm). Infrared, microwaves, and radar occupy broad ranges of the spectrum, but, of course, cannot be seen. These wavelengths interact with matter in fundamentally different ways from visible light, and are used very differently in their applications. Therefore, the emphasis in these fields has been different from each other, and from the field of visible light.

Perhaps another reason wire grid polarizers have not been generally used in visible light applications is that there was no perceived need for the wire grid polarizer in such applications. As discussed above, numerous polarizers were already available for visible light applications. Therefore, there was no identifiable reason to develop the wire grid polarizer to make it suitable for use in visible light.

Perhaps the most significant factor discouraging use of wire grid polarizers in visible light applications is the prevailing view that wire grid polarizers are characterized by relatively low extinction ratios. Visible light applications typically require higher extinction ratios than provided by wire grid polarizers. In the visible light field, other polarizer devices with higher extinction ratios were available.

As can be seen, the polarization technologies applied in the long wavelengths characterized by radar, microwaves, and the infrared are distinct in structure and in their physics from the polarizers typically used in the visible spectrum. This situation is a natural result of the separate history of technology development in these fields, the availability of appropriate alternative technologies, and the different goals of those skilled in the arts appropriate to each field. These differences continue to segregate polarizer devices for visible light from the polarizer devices for longer wavelengths even today.

One of the isolated occurrences of a wire grid polarizer within a visible light application is disclosed in U.S. Pat. No. 4,688,897, issued Aug. 25, 1987, to Grinberg et al. Grinberg et al. disclosed a wire grid polarizer in a liquid crystal display to reduce parallax. Essentially, the concept was to use the wire grid polarizer as a mirror to reflect a single polarization. The wire grid polarizer is relatively thin and is chemically compatible with the liquid crystal material. Thus, it can be disposed adjacent the liquid crystal without chemical interference and without a gap between the liquid crystal and the polarizer. Elimination of this gap eliminates parallax in the display.

Much like the traditional polarizers discussed above, one problem with this application of a wire grid polarizer is efficiency. Only the reflected polarization of the light entering the display is used to create an image. The passed polarization of the light passes through the polarizer and is discarded. The purpose of the wire grid polarizer in this application was not to create a polarized light beam in any way, but to solve a specific problem with a particular type of liquid crystal display, i.e. parallax. Furthermore, the wire grid polarizer was merely an improved replacement component in a pre-existing optical system.

Another one of the few uses of a wire grid polarizer in a visible light application is disclosed in U.S. Pat. No. 5,383,053, issued Jan. 17, 1995, to Hegg et al. Hegg et al. disclosed a wire grid polarizer in a virtual image display system to improve the reflection/transmission efficiency over conventional beam splitters. Essentially, the concept was to use the wire grid polarizer as a beam splitter. The system involved first reflecting an image off the beam splitter and then reflecting it back through the beam splitter. Conventional beam splitters were inefficient because less than 50% of incident light was first reflected and less than 50% of the reflected light was then transmitted. In other words, the net efficiency of this system it was less than 25%. Hegg et al. disclosed using the wire grid polarizer with a polarized image source because the reflection/transmission efficiency of the wire grid was relatively high. Therefore, although the wire grid polarizer had a low extinction ratio, it could still be used as a high efficiency beam splitter, at least with well polarized light. In addition, the purpose of the wire grid polarizer in this application was not to create a polarized light beam in any way (the light was already polarized), but to solve a problem with a virtual image display, i.e. inefficient beam splitters. Furthermore, the wire grid polarizer was merely used as a replacement component in a pre-existing optical system.

As indicated above by Hegg et al., it has been known that a wire grid could be used as a beam splitter. As another example, U.S. Pat. No. 3,631,288, issued Dec. 28, 1971, to Rogers discloses an automobile headlight for emitting polarized light. The purpose of the headlight is to reduce glare for an oncoming or approaching automobile with a polarizer over its windshield oriented perpendicular to the polarization of the headlight.

The headlight has a light source disposed in an enclosure formed by a parabolic, polished metal, reflecting surface and a parabolic reflective polarizer. Light having a first polarization is transmitted through the polarizer while light having a second, orthogonal polarization is reflected from the polarizer. Rogers discloses that the polarizer may be a multilayer birefringent polarizer or wire grid arrays in glass. The reflected light from the polarizer is reflected back to the metal reflective surface where it is reflected back to the polarizer.

In addition, the metal surface alters the linearly polarized reflected beam to elliptically polarized light. A "small amount" of the elliptically polarized light is light of the first polarization and is transmitted through the polarizer while the rest is again reflected by the polarizer back to the reflective metal surface. This process of continually cycling light back and forth between the polarizer and metal surface with a "small amount" being transmitted through the polarizer with each cycle is repeated "ad infinitum."

One problem with this device is its poor efficiency. The best known reflective metal surface, silver, reflects no more than 98% of the incident light. Thus, as the process repeatedly reflects light back to and from the metal surface, more and more light is lost.

In addition, because the emissive light source is positioned within the reflective enclosure, much of the reflected light is directed back into the emitter. We define "light source" as the light emitter and the optical elements that gather light from the emitter and form it into a beam.

Similarly to the above patent, U.S. Pat. No. 3,566,099, issued Feb. 23, 1971, to Makas, discloses an automobile headlight for emitting polarized light. The headlight has a light source disposed in an enclosure formed by a parabolic, polished metal, reflecting surface and a reflective polarizer. Makas only discloses that the polarizer may be a diffusion or interference type. A quarter wave plate is disposed in front of the polarizer. Light having a first polarization is transmitted through the polarizer while light having a second, orthogonal polarization is reflected from the polarizer. The wave plate changes the polarization of the reflected light as it passes therethrough between the polarizer and the reflector. Like the prior patent, Makas directs the reflected beam back towards the light source.

Positioning the light source within the reflective enclosure such that the light having the polarization which is reflected from the polarizer must pass back into the light source is not desirable. It is generally accepted when working with a bright light source such as headlamps, or even brighter light sources used in current liquid crystal light valve projector systems, that reflecting light back into the light source where it can encounter and be absorbed by the filament is undesirable. Reflected light which falls on the filament will overheat the filament, leading to premature failure of the light source. It is also a poor method for conserving light energy, because the light energy re-absorbed by the filament is not re-radiated as light of the same wavelength going in the desired direction, but as electromagnetic energy spanning the infra-red to the ultraviolet traveling in all directions. Use of a parabolic reflector with the light source filament at the focal point, which is highly desirable for the production of a collimated beam of light, is especially conducive to this problem because it will direct the majority of light reflected back into the source onto the filament.

Rogers teaches the use of a filament with "loose coils" to try to escape this problem, but this would then leave the effect of enlarging the filament in breadth, reducing the degree of collimation produced by the parabolic reflector, and possibly also reducing the energy-to-light conversion efficiency of the light source. Rogers also speculates that altering the geometric relationship between the filament and the focal point of the parabolic reflector may be desirable for various reasons. Alterations of this nature for the purpose of mitigating against reflected light encountering the filament are also likely to reduce the efficiency of the optical system overall. For these and other reasons it is desirable to specifically avoid reflecting light back into the light source as part of a scheme to increase the polarization efficiency.

For these and other reasons, wire grid polarizers for polarization of visible light have continued to be ignored by optical engineers and device manufacturers. Those skilled in the art of the projection and display fields have continued to search for improvements by pursuing refinements of the traditional visible light polarizers. Although these efforts have resulted in several clever and ingenious variations of conventional polarizer systems, these devices are still constrained by the limitations inherent in the polarizer itself.

Therefore, it would be advantageous to develop a polarizer device and apparatus operable within the visible spectrum and near visible spectrum for physically decoupling two orthogonal polarizations of a source light beam into two polarized beams and selectively directing these beams in substantially any direction. It would also be advantageous to develop such a device capable of being positioned at substantially any incidence angle within an apparatus so that significant design constraints are not imposed on the optical system, but substantial design flexibility is permitted. It would also be advantageous to develop such a device for efficiently producing a generally linearly polarized beam of light from a generally unpolarized light source without wasting substantial portions of the source light and without the need for complex and precise optics. It would also be advantageous to develop such a device with a large acceptance angle capable of accepting relatively divergent light.

OBJECTS AND SUMMARY OF THE INVENTION

It is an object of the present invention to provide a polarizer device for physically decoupling two orthogonal polarizations of a source light beam into two polarized beams.

It is another object of the present invention to provide such a polarizer device capable of selectively directing either or both polarized beams at substantially any angle.

It is yet another object of the present invention to provide such a polarizer device capable of focusing either or both polarized beams.

It is yet another object of the present invention to provide such a polarizer device which functions adequately while positioned with respect to the source light beam at substantially any incident angle.

It is yet another object of the present invention to provide such a polarizer device with a large acceptance angle capable of accepting relatively divergent light.

It is yet another object of the present invention to provide a polarizer device and apparatus for efficiently and simply producing a generally linearly polarized beam of light from a generally non-polarized source light beam.

It is a further object of the present invention to provide such a polarizer device and system for use in image projection systems, light projection systems, and/or display systems.

These and other objects and advantages of the present invention are realized in a polarizer apparatus having an arrangement of generally parallel elongated elements disposed in a source light beam. The elements interact with the electromagnetic waves of the source light beam to generally (i) pass light having a polarization oriented perpendicular to the length of the elements, and (ii) reflect light having a polarization oriented parallel to the length of the elements. The passed light defines a passed beam with a first polarization X and the reflected light defines a reflected beam with a second polarization Y.

The arrangement of elements may be positioned with respect to the source light beam at substantially any incidence angle. In addition, the arrangement of elements accepts relatively divergent source light. Furthermore, the arrangement of elements may be positioned to selectively direct the reflected beam in substantially any direction. The consequence of these advantageous is design flexibility and a polarizer device that does not limit the application of the polarizer apparatus.

The arrangement of elements may be disposed on or in a substrate. The substrate provides protection and support to the elements. The passed beam passes through the elements and the substrate.

The polarizer apparatus may be used to efficiently and flexibly produce a generally polarized light beam from a generally unpolarized source light beam. The source light beam is directed at the arrangement of elements that passes polarizations perpendicular to the elements and reflects polarization parallel to the elements. A recapture optic, such as a mirror, is disposed in the reflected and/or the passed beam to change the direction of the beam so that both beams are directed to a common area. The arrangement of elements and the light recapture device direct the beams so that they are not directed back into the light source. A polarization reorientation device, such as a wave plate, is disposed in the reflected and/or the passed beam to change the orientation of the beam so that both beams have the same orientation, or polarization. The polarization reorientation device changes the polarization orientation of substantially all of the reflected beam in a single cycle.

The arrangement of elements, recapture optic, polarization reorientation device, and other optical elements may be located and positioned as needed or desired. The arrangement of elements may be positioned to direct the reflected beam to the recapture optic or polarization reorientation device. The other optical elements may further treat the light beams as desired.

The arrangement of elements may be configured to focus or otherwise affect the reflected beam. The elements may be formed into non-planar layers such as cylindrical, spherical, elliptical or parabolic shapes as well as other more complex, figured optical shapes. In addition, the substrate may be configured to focus, or otherwise affect the passed beam. The substrate may be formed into non-planar configurations such as cylindrical, spherical, elliptical or parabolic shapes as well as other more complex, figured optical shapes.

The elements may be combined with other optical elements, such as wave plates, lenses, prisms, etc. In addition, the substrate may be formed by optical elements.

The polarizer apparatus may be part of a projection or display system.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention.

Figure 1:
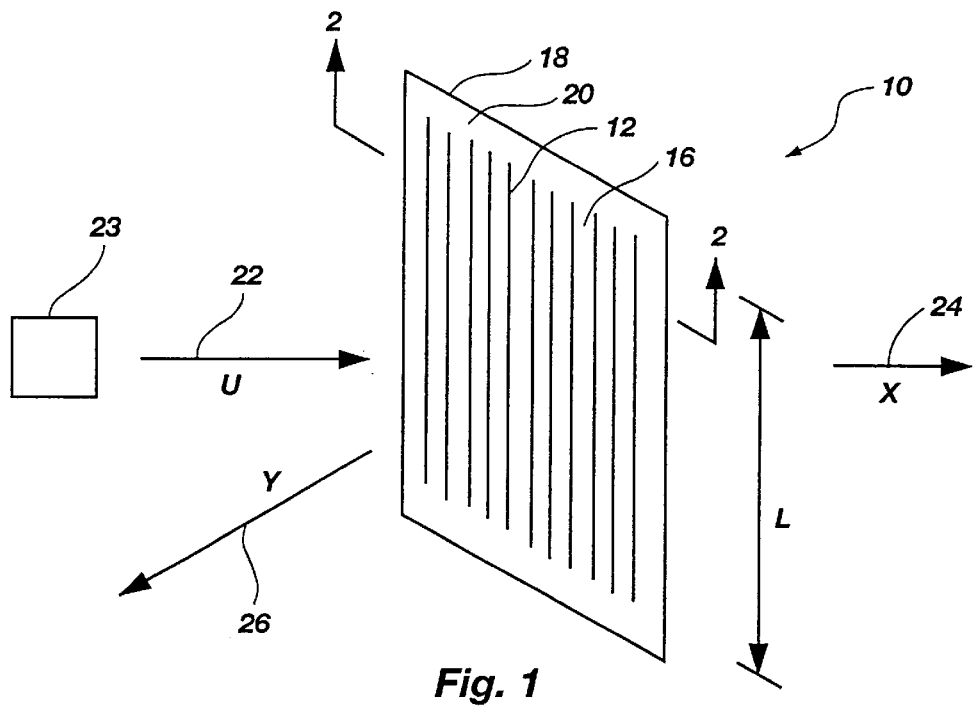
FIG. 1 is a perspective view of a preferred embodiment of a polarizer device of the present invention.
Figure 2:
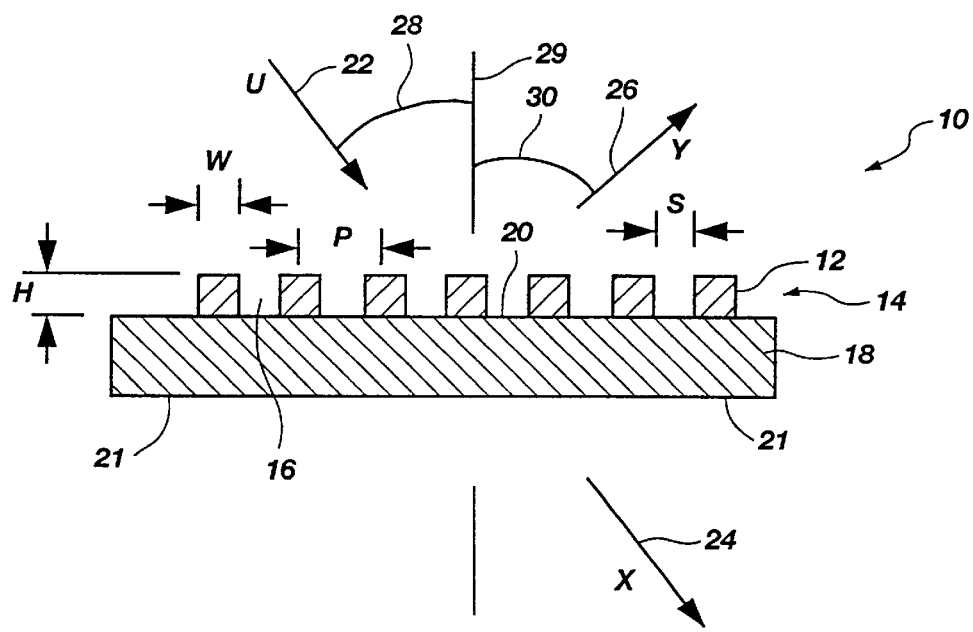
FIG. 2 is a cross sectional view of the preferred embodiment of the polarizer device of the present invention taken along line 2—2 of FIG. 1.

As illustrated in FIGS. 1 and 2, a preferred embodiment of a polarizer device of the present invention is shown, indicated generally at 10. The polarizer device 10 has a generally parallel arrangement of thin, elongated elements 12. The elements 12 are generally disposed in a layer, indicated by 14 in FIG. 2. Although the elements 12 are shown as laying in a plane, the imperfections inherent in materials may cause the elements to be somewhat uneven. In addition, the elements 12 and layer 14 may be planer, or may be curved or otherwise figured as discussed in further detail below.

The elements 12 are relatively long and thin. The dimensions of the elements and the dimensions of the arrangement of elements are determined by the wavelength used. The dimensions given below are tailored for broad or full spectrum visible light. Each element 12 has a length, indicated by L in FIG. 1, that is generally larger than the wavelength of visible light. Thus, the elements 12 have a length of at least approximately 0.7 $\mu$m (micrometers), or 700 nm (nanometers). The typical length, however, may be much larger.

In addition, the elements are located in generally parallel arrangement with the center-to-center spacing, or pitch, of the elements, indicated by P in FIG. 2, smaller than the wavelength of light. Thus, the pitch will be less than 0.4 $\mu$m (micrometers) or 400 nm (nanometers). Preferably, the pitch will be less than one third of the wavelength of light, or approximately 0.13 $\mu$m or 130 nm. In addition, each element 12 has a width, indicated by W in FIG. 2, that may range from 10% to 90% of the pitch P. Thus the spaces 16 separating the elements have a width, indicated by S in FIG. 2, that will range from 90% to 10% of the pitch P. The elements 12 also have a thickness, indicated by H in FIG. 2, that is preferably greater than approximately 200 Å or 20 nm. Furthermore, the elements 12 are preferably regularly or equally spaced.

The element width W and spacing S can be selected to optimize the performance of the polarizer device for specific applications. Increasing the width of the elements with respect to the pitch will increase the reflectivity for the parallel polarization to nearly 100% while also increasing the reflectivity for the orthogonal polarization above the ideal value of 0%. Thus, a high ratio of element width to spacing will provide high extinction ratio for transmitted light (since none of the parallel polarization is transmitted, but not necessarily high efficiency (since some of the orthogonal polarization will be reflected). Conversely, a low ratio of element width to pitch will provide high extinction ratio for the reflected beam, but not necessarily high efficiency. The highest total efficiency, as defined by the sum of the reflectivity for the parallel beam and the transmissivity for the orthogonal beam, is likely to be obtained when the ratio of the element width to pitch is 40% to 60%.

As indicated above, these dimensions are tailored for broad or full spectrum visible light. Other dimensions may be appropriate for particular wavelengths, such as a particular color of visible light, or near visible spectrum including near infrared (IR) wavelengths and near ultraviolet (UV) wavelengths.

The arrangement of elements 12, as shown in FIGS. 1 and 2, are not drawn to scale and have been greatly exaggerated for clarity. In fact, the arrangement of elements is imperceptible to the naked eye and appears as a partially mirrored surface when observed without extreme magnification. The elements 12 are formed of any material that is capable of being formed into a broad spectrum mirror, such as a metal. Preferably, the material is silver or aluminum for visible light applications.

The polarizer device 10 also has a substrate 18 for supporting the arrangement of elements 12. The substrate 18 has a first surface 20 upon which the arrangement of elements 12, or layer 14 of elements, is disposed and a second surface 21 on an opposing or opposite side. The substrate 18 provides support for the elements 12 and some degree of protection. Alternatively, the elements 12 may be sandwiched between two substrates or formed within the substrate itself for additional protection and support. The elements also may be disposed on both sides of the substrate or disposed in one or more layers. The substrate 18 is formed of any material that allows light to pass through it. The material may be transparent to light or interact with the light as discussed more fully below. Preferably, the substrate 18 is formed of a glass material. Alternatively, the substrate may be formed of a polymer or crystalline material. Other substrates compatible with the principles disclosed herein are certainly possible and should also be considered within the scope of the invention.

As illustrated in FIG. 1, the general operation of the preferred embodiment of the polarizer device 10 is shown. A source light beam 22 is produced by a light source 23 and directed towards the polarizer device 10, comprising the arrangement of elements 12. The source light beam 22 and its various branches form various paths represented by arrows in the drawings. The source light beam 22 is generally unpolarized U, and includes electromagnetic waves having a first polarization X, and a second polarization Y, which is orthogonal to the first polarization. The use of the labels X, Y and U in the drawings indicates which polarization a particular beam has.

The elements 12 interact with the electromagnetic waves of the source light beam 22. The elements 12 transmit, or pass, light with a polarization orthogonal to the length of the elements. This passed light defines a passed or transmitted light beam 24 of a first polarization, indicated by X. The elements 12 also advantageously reflect light with a polarization parallel to the length of the elements. This reflected light defines a reflected light beam 26 of a second polarization, indicated by Y. The substrate 18 allows the passed light beam 24 to pass through it. Thus, the polarizer device 10 physically decouples the two orthogonal polarizations, X and Y, of the source light beam 22, the first polarization X passing through the elements 12, and the second polarization Y being specularly reflected by the elements.

It is of course understood that the arrangement of elements 12 separates the two polarizations of the source light beam with a certain degree of efficiency, or extinction ratio. In other words, the elements generally transmit the polarization orthogonal to the length of the elements, but may also pass a certain amount of the polarization parallel to the length of the elements as well. Preferably, the arrangement of elements transmits substantially all the polarization orthogonal to the length of the elements and reflects substantially all the polarization parallel to the length of the elements. Thus, approximately one-half of the light is transmitted while the other one-half is reflected. The efficiency, or extinction ratio, of the arrangement of elements is determined, at least partially, by the width and spacing of the elements, as discussed above.

The polarizer device 10 of the present invention represents a significant improvement over prior art visible light polarizers that absorb or scatter one of the polarizations of light rather than providing specular reflection. Because the arrangement of elements 12 reflects the second polarization Y, this polarization may now be recaptured or redirected and used. In addition, because the arrangement of elements is a specular, or mirror-like, reflector, the angle of incidence 28 of the source light beam 22 equals the angle of reflection 30 for the reflected beam 26, as shown in FIG. 2. (The angle of incidence 28 is measured with respect to an axis 29 that is normal to the arrangement of elements or the polarizer device.)

Figure 3:
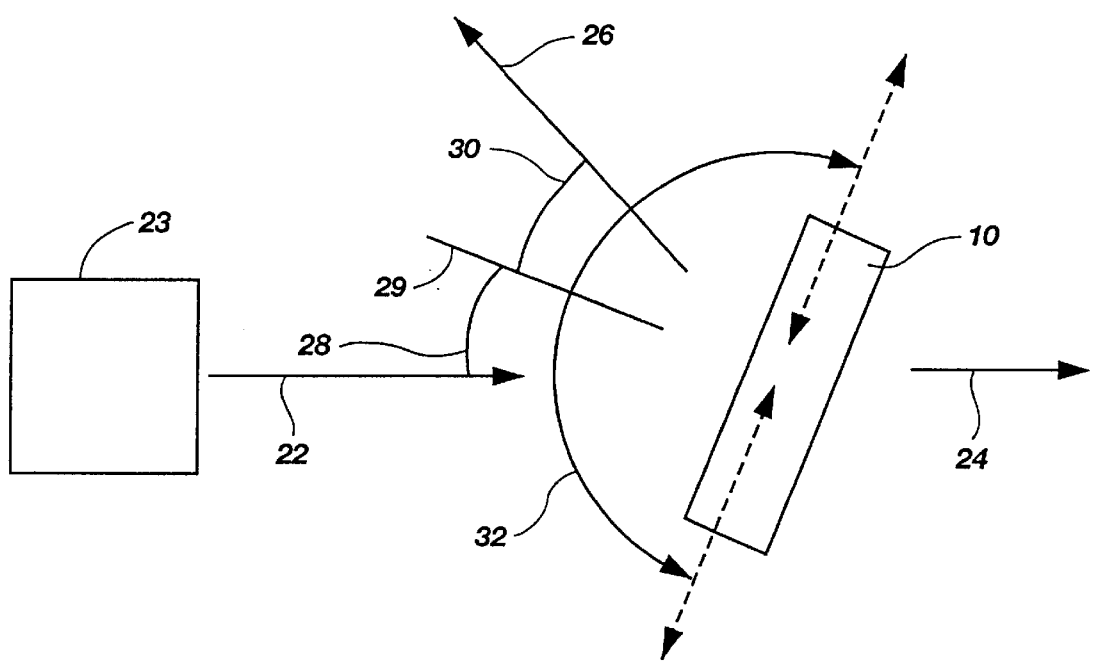
FIG. 3 is a schematic view showing the broad range of potential incidence angles and the broad range of potential reflection angles of the preferred embodiment of the polarizer device of the present invention.

As illustrated in FIG. 3, the polarizer device 10, or arrangement of elements 12, advantageously may be positioned with respect to the source light-beam 22 at substantially any incidence angle, as indicated by 32.

Indeed, the polarizer device 10 of the present invention represents a significant improvement of prior art visible light polarizers because the source light beam may encounter the arrangement of elements at substantially any angle. Many prior art polarizers severely limit the range of angles at which the source light beam may encounter the polarizer, providing only a narrow operating window. The polarizer device of the present invention results in design flexibility because the polarizer may be oriented as desired with respect to the source light and beam.

In addition, the polarizer device 10 advantageously accepts relatively divergent light. As discussed above, the source light beam 22 is comprised of individual rays with slightly different angles resulting in a light beam having a somewhat diverging, or converging, cone. The polarizer device is able to handle the divergent light, or a variety of different angles of incidence within the beam itself, in addition to the angle of incidence of the source light beam. The polarizer device 10 of the present invention again represents a significant improvement over prior art visible light polarizers, which are unable to accept other than narrowly divergent light. Thus, the polarizer device of the present invention may make use of more divergent light sources and can be more efficient in gathering light from these sources. The consequence is that light sources that are less advanced, less expensive, and less powerful may be used to achieve similar results.

Furthermore, the polarizer device 10, or the arrangement of elements 12, advantageously may selectively direct the reflected beam 26 within a broad range of reflection angles. The polarizer device effectively functions as a mirror for the reflected polarization, such that the angle of reflection is symmetrical to the angle of incidence on the opposite side of the normal to the polarizer surface. However, since the polarizer device 10 may be positioned with respect to the source beam at substantially any angle, the incidence angle can be selected to direct the reflected beam at any desired angle, also indicated by 32.

The polarizer device 10 of the present invention again represents a significant improvement over prior art polarizers that severely limit the direction, or range of potential reflection angles, of the reflected beam to a narrow window. This improved polarizer 10 provides design flexibility because the reflected beam may be directed as desired with respect to other optical elements. Thus, light recapture optics may be placed anywhere in the angular range 32.

A primary purpose of the polarizer device 10 is to physically decouple the two orthogonal polarizations, X and Y, of the source light beam 22 into two generally polarized beams 24 and 26 that can respectively be controlled. For example, the polarizer device may selectively direct one or both of the polarized beams in substantially any direction. Furthermore, the polarizer device 10 does not impose undue limitations on the placement and orientation of the device with respect to the source light beam 22 or on the divergence of the source light beam. Until this point, prior art visible light polarizers have been severely limited with respect to arbitrary selection of orientation to the source light beam. Similar limitation existed with respect to arbitrarily directing the reflected beam or accepting other than narrowly divergent light sources.

A further advantage of the polarizer device 10 is its ability to tolerate rapid temperature increases and prolonged high temperature. In contrast to typical delicate polarizer devices, the polarizer device of the present invention is rugged. High temperatures and rapid temperature increases do not significantly affect the ability of the elements to transmit and reflect light. The device also tolerates vibration because the elements are secured to the substrate. In addition, the device does not degrade due to photochemical reactions within the structure. These features produce major cost savings for both manufacture and maintenance and opens the door for many new applications that before were impractical.

An additional advantage of the subject polarizer is its ability to operate uniformly and consistently over the broad bandwidth of visible light. Most polarizer applications within visible light require uniform performance substantially the same at all colors or wavelengths from roughly 450 nm to 700 nm wavelength. Prior art polarizers, other than certain dichroic polarizers, could only achieve such broad, achromatic performance by compromising other important aspects of their performance and increasing cost of manufacture and operation. The achromatic performance characteristic of the present invention will enable the device to function in a variety of applications with minimal need for optimization, again leading to cost savings and efficiency in manufacturing.

In addition to the above, the polarizer device 10 may also direct the transmitted beam as well as the reflected beam, as discussed more fully below. Furthermore, the polarizer device 10 may also focus the reflected and/or transmitted beams, again as discussed more fully below. The directing and focusing of both reflected and transmitted beams expand optical processing capabilities of the polarizer of the present invention to applications that were substantially unheard of in prior art visible light polarizers. Therefore, the polarized beams 24 and 26 may be further processed for other applications requiring polarized light, such as projection and display systems.

Figure 4:
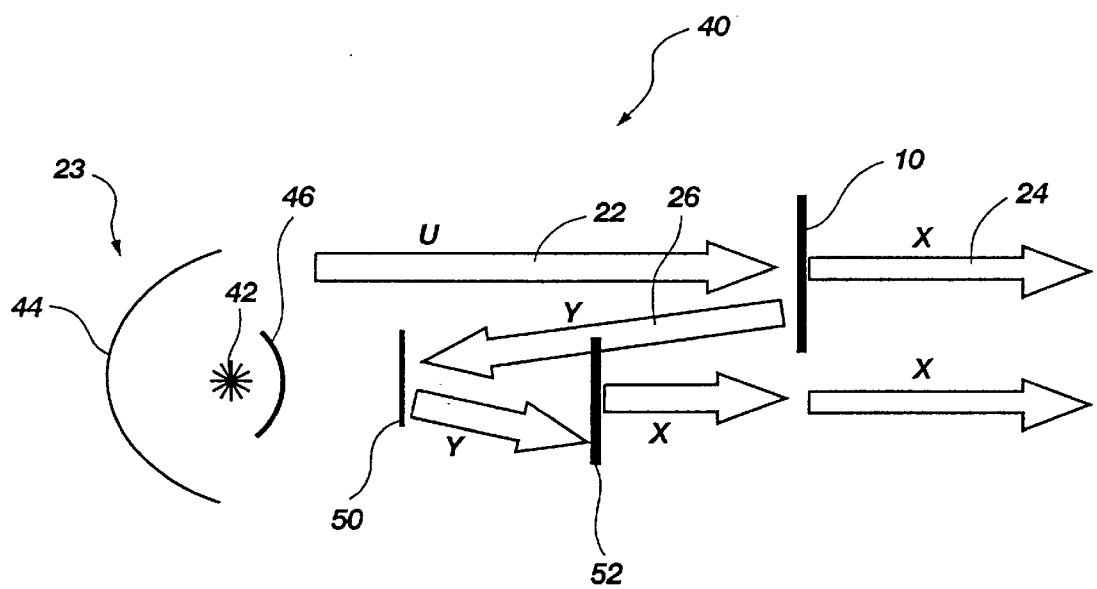
FIG. 4 is a schematic view of the general operation of a preferred embodiment of a polarizer apparatus of the present invention.

The general operation of a preferred embodiment of a polarizer apparatus 40 is illustrated in FIG. 4. Such an apparatus is particularly well suited for projection and display systems. A source light beam 22 is produced by the light source 23. The light source 23 is selected to met the needs and requirements of the specific application. A physically smaller light source (referring to the size of the structure that actually produces the light) is preferred since this offers inherent optical advantages, but a larger light source may be necessary for applications requiring more power, such as projection systems. Alternatively, other light sources may be used such as incandescent bulbs, lasers, glow discharges, etc.

Typically, the light source 23 is generally unpolarized, but may be partially polarized in some instances, such as with lasers. For the preferred embodiment of a polarization device for use in a projection system or display system, the light source 23 should generate a spectrum of wavelengths that produce a satisfactory image quality and color gamut. Alternatively, monochromatic and polychromatic light sources may be satisfactory for other applications. In addition, the supports (not shown) and power supply contacts (not shown) should be small, and designed and placed to reduce or eliminate unacceptable shadows, glints, and other artifacts in the light beam.

The light source 23 typically has a light producing element 42 disposed in an enclosure (not shown). In addition, reflectors 44 and 46 are typically placed around the element 42 to increase the amount of light directed into the desired output beam 22 with the desired degree of collimation. The reflectors 44 and 46 may be given a curve or figure calculated to form the light into a beam with the desired collimation and direction for an image projector or other intended use. Minimal constraints should be placed on the light source. The function of the light source is to produce a beam or cone of light of the appropriate color mix that is sufficiently collimated and provides sufficient optical brightness to meet the needs of the intended use.

As described above, the source light beam 22 and its various branches take various paths. These paths are represented by arrows in the drawings. The source light beam 22 is generally unpolarized, indicated by U, and includes electromagnetic waves having a first polarization, indicated by X, and a second polarization, indicated by Y, orthogonal to the first polarization.

The polarizer apparatus 40 advantageously has a polarizer device 10 disposed in the source light beam 22 so that the light beam is incident on the polarizer device. The polarizer device 10 is of the type described above and has an arrangement of generally parallel elements for transmitting and reflecting orthogonal polarizations of the source light beam. As before, the orthogonal polarization X is passed, defining the passed or transmitted beam 24, and the parallel polarization Y is reflected, defining the reflected beam 26. Thus, approximately one-half of the light is transmitted while the other one-half is reflected. The arrangement of elements 12 is oriented with respect to the source light beam 22 within the broad range of potential incidence angles to direct the reflected beam 26.

Figure 5:
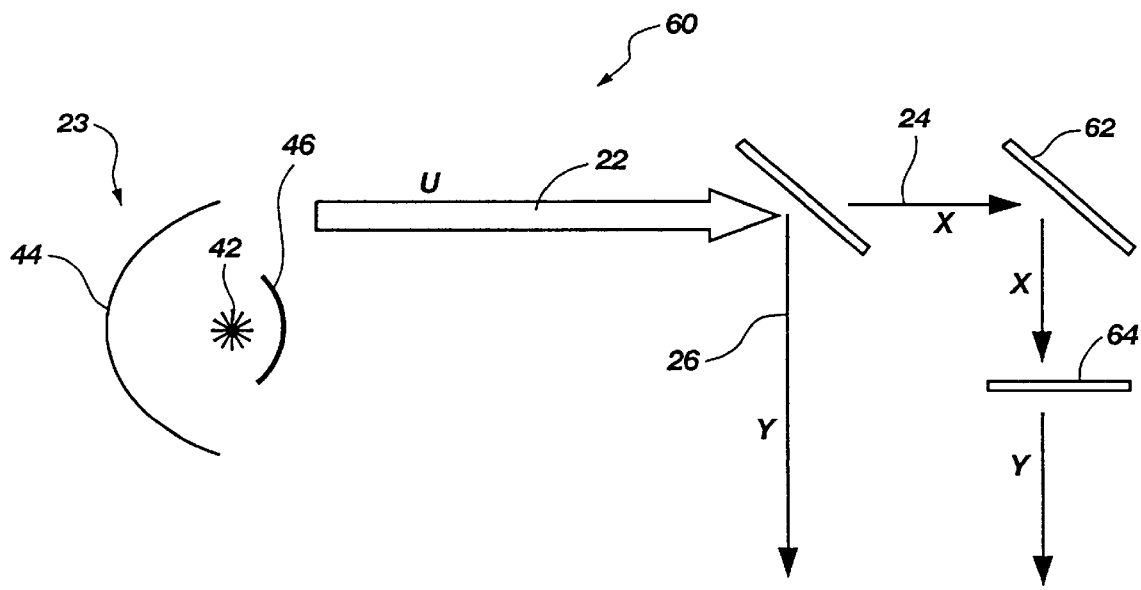
FIG. 5 is a schematic view of the general operation of an alternative embodiment of a polarizer apparatus of the present invention.

The polarization apparatus 40 also has a recapture optic 50 disposed in the path of the reflected beam 26 for intercepting the reflected beam. The recapture optic 50 also redirects the reflected beam 26 in a desired direction. Preferably, the recapture optic 50 directs the reflected beam 26 in the same direction as the transmitted beam 24, or so that both beams are directed toward a common area. Alternatively, the light recapture optic may be disposed in the optical path to intercept the transmitted beam 24 to redirect it in the same direction as the reflected beam 26, as shown in FIG. 5. The recapture optic 50 is preferably a mirror, but may be any suitable optical element including lenses, prisms, light guides, fiber optics, etc. The recapture optic 50 intercepts the reflected beam 26 and directs it so that the beams are directed toward a common area, or so that the two beams may be recombined. The reflected and transmitted beams 24 and 26 are preferably recombined such that both beams are coaxial, or so that a portion of the beams after being separated become coaxial. In addition, the reflected and transmitted beams preferably have the same divergence. Alternatively, both beams may be directed so that they are disposed adjacent and parallel to one another to form a single beam. Alternatively, one beam may fill in dark spots in the other. Of course other useful arrangements can be defined.

It should be noted that the reflected beam 26 is not directed back to the reflectors 44 and 46 of the light source 23. The polarizer device 10 is disposed in the reflected beam 26 at an orientation so that the reflected beam 26 is not directed back into the light source 23. Thus, the reflected beam 26 is not reabsorbed, scattered, or depolarized by the light source 42. Although the recapture optic 50 is depicted as returning the reflected beam 26 back towards the passed beam 24, the recapture optic 50 may also direct the reflected beam 26 back towards the polarizer device 10 and the arrangement of elements 12. The use of the recapture optic 50 in conjunction with the arrangement of elements 12 represents a significant improvement over prior art polarization devices, which absorb or discard the rejected polarization, by recapturing and using the reflected polarization.

It should also be noted that the recapture optic 50 is separate from the light source 23, or from the reflectors 44 and 46 of the light source 23. The recapture optic 50 is physically positioned in a different location from the light source 23. Therefore, the reflected beam 26 is not reflected back into the reflectors 44 and 46, and thus back into the light element 42.

At this point, the reflected and transmitted beams 24 and 26 have orthogonal polarizations. The polarization apparatus 40, however, has a polarization reorientation device 52 disposed in the reflected beam 26 for rotating the polarization of the reflected beam 26 from polarization Y, parallel with the elements 12, to polarization X, orthogonal with the elements and the same as the polarization of the transmitted beam 24. The polarization reorientation device 52 is preferably a wave-plate or similar phase retardation optic. In this case the wave-plate is a half-wave plate and rotates the orientation of the reflected beam 26 from polarization Y to polarization X as it passes through the wave-plate.

The polarization reorientation means substantially changes the polarization orientation from one linear polarization to an orthogonal linear polarization, as opposed to a circular or elliptical polarization. For example, the polarization reorientation means substantially changes the polarization orientation of the reflected beam from the second polarization Y to the first polarization X. In addition, the polarization reorientation means preferably changes the polarization orientation of substantially all of the beam in a single pass, or two passed, of the beam through or past the polarization reorientation means, as opposed to continually cycling the beam past the polarization reorientation means. For example, as the reflected beam passes through the polarization reorientation means, the polarization orientation of substantially all of the beam is changed from the second polarization to the first polarization as it passes therethrough in a single pass, or two passes.

In summary, the above device of the present invention represents a significant improvement over prior art polarizers. The polarization device efficiently and flexibly produces a generally polarized light beam from a generally unpolarized beam of light. The device is efficient and does not discard or absorb one of the polarizations. In addition, the design of the device, such as the placement and orientation of the various optical elements, is flexible. The polarizer device may be positioned within a broad range of potential angles to direct the reflected beam to the recapture optic. The recapture optic and polarization reorientation device may be flexibly positioned and oriented to achieve the desired beam. The advantages obtained through this flexibility may include smaller optical devices, lower weight, more power and light efficiency, and a reduced number of optical elements in the system. Certain of these advantages are illustrated within the preferred embodiments.

As shown in FIG. 4, the polarization reorientation device 52 is disposed in the reflected beam after the recapture optic 50. The polarization reorientation device 52, however, may be disposed in the reflected beam before the recapture optic 50. In addition, the polarization reorientation device 52 may be disposed in the reflected beam so that the reflected beam 26 passes through the device 52 before and after the recapture optic 50. If the polarization reorientation device 52 is a wave-plate, then a quarter-wave plate may be used and disposed so that the reflected beam 26 passes through the quarter wave plate before and after the recapture optic 50.

After the reflected beam 26 passes through the polarization reorientation device 52 it has the same polarization as the passed beam 24, or polarization X. The reflected beam 26 is advantageously recombined with the passed beam 24 as a co-directional, co-axial part of the resulting beam so that substantially all the source beam of light 22 is converted to a single polarization of polarization X. The reflected beam 26 may be reoriented to polarization X by the polarization reorientation device 52 and directed back towards the passed beam 24 by the recapture optic 50 as shown in FIG. 4. The reflected beam 26 need not be directed back towards the polarization device 10 because the polarization orientation of substantially all of the reflected beam 26 has been changed from polarization Y to polarization X in a single pass, or two passes.

In the case where the polarization reorientation device 52 is disposed in the reflected beam so that the reflected beam 26 passes through the device 52 before and after the recapture optic 50, the reflected beam 26 actually makes two passes through the polarization reorientation device 52. In the first pass the polarization of the reflected beam is changed to elliptical polarization, but is then changed back to an orthogonal linear polarization in the second pass. Because the polarization reorientation device 52 is deliberately located so that the reflected beam 26 must pass therethrough twice, the polarization reorientation device 52 cannot change the polarization from a first linear polarization to a second, orthogonal polarization in a single pass or the beam would remain essentially unchanged.

The path of the reflected beam 26 from the polarizer device 10, to the recapture optic 50, and back towards the transmitted beam 24 defines a single cycle in which the polarization orientation of substantially all of the reflected beam 26 is changed from a first linear polarization Y to a second, orthogonal polarization X. The reflected beam 26 preferably makes only two or less passes through the polarization reorientation device 52, or a single cycle.

Such a configuration, however, is distinguishable from a system in which the reflected beam makes multiple, continuous passes or cycles past the reorientation device to randomly create a small portion of linear polarized light amongst the elliptically polarized beam. Therefore, locating the polarization reorientation device 52 so that the reflected beam must pass through twice is considered only a single cycle, and is consistent with the principles of the present invention that substantially all of the polarization orientation of the beam be changed from a first linear polarization to a second, orthogonal polarization without continually cycling the light to obtain minimal amounts of the desired polarization with each repeated cycle.

The reflected beam 26 may also be directed back towards the polarization device 10. Because the reflected beam 26 has been reoriented to polarization X, it will pass through the arrangement of elements 12 as did the passed beam 24, which is also of polarization X. In either case, the source beam 22 is substantially converted to a single polarization without discarding or absorbing a particular polarization. Therefore, the polarization apparatus 40 of the present invention is more efficient than prior art devices.

As referred to above, the layer 14 of elements 12 may be configured to focus, or otherwise affect the reflected beam 26. For example, the layer 14 may be formed into non-planar configurations such as cylindrical, spherical, elliptical or parabolic shapes and other more complex, figured optical shapes. The use of a curved or figured polarizer represents a significant improvement over prior art polarizers that generally have been limited to planar configurations, such as films and prisms. Limitations on the incident angle of prior art polarizers substantially prevented the configuring of prior art polarizers in shapes other than planar.

Also as referred to above, the substrate 18 may be similarly configured to focus, or otherwise affect the transmitted beam 24. For example, the substrate 18 may be formed into non-planar configurations such as cylindrical, spherical, elliptical or parabolic shapes and other more complex, figured optical shapes. Therefore, both the reflected and transmitted beams 24 and 26 may be focused, or otherwise treated, as desired.

In addition, the layer 14 may be combined with other optical elements, such as a wave-plate, a lens, or a prism, so that several functions are performed by a single element. The optical elements may form the substrate on which the layer 14 of elements 12 is disposed. For example, the layer 14 of elements 12 may be placed on the surface of a wave-plate so that the sequence in which the light beams encounter the wire grid polarizer is preserved. Furthermore, the layer 14 of elements 12 may be disposed within the optical elements or disposed on both sides thereof.

The general operation of the polarization apparatus of the present invention has been described and illustrated above. Other optical elements, such as lenses and mirrors, may be added to further improve the optical qualities of the light beam produced, to enhance the efficiency of the polarization conversion, or for simple convenience. In addition, the optical path may be modified or given a different configuration. The additional optical elements and the various configurations of the optical path may be combined with the various modifications of the arrangement of elements 12 described above to achieve a desired beam of light. Some of these possibilities will be described and illustrated in specific illustrative alternative embodiments below.

Referring again to FIG. 5, the general operation of an alternative embodiment of a polarizer apparatus 60 of the present invention is shown. This embodiment is similar to the embodiment illustrated in FIG. 4, except that the recapture optic 62 has been disposed in the transmitted beam to intercept the transmitted beam 24, rather than the reflected beam 26. In addition, the polarization reorientation means 64 has been disposed in the transmitted beam to change the orientation of the transmitted beam 24, rather than the reflected beam 26, from the first polarization X to the second polarization Y. Again, the recapture optic 62 is oriented so that the transmitted beam 26 is not directed back into the light source 23.

Figure 6:
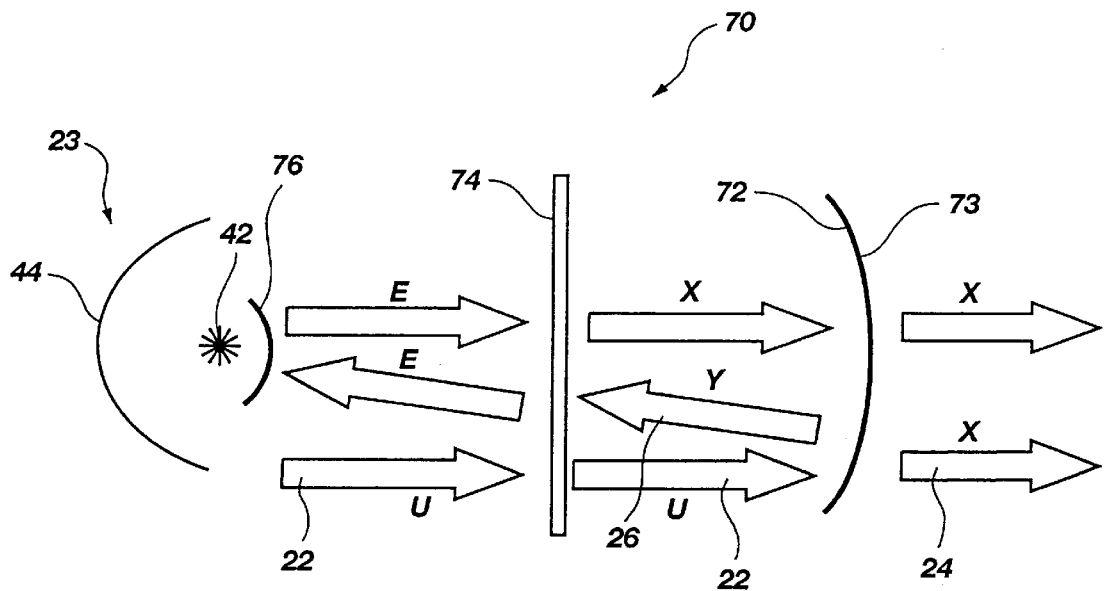
FIG. 6 is a schematic view of the general operation of an alternative embodiment of the polarizer apparatus of the present invention.

As illustrated in FIG. 6, the general operation of an alternative embodiment of a polarizer apparatus 70 of the present invention is shown in which a curved or figured layer of elements and/or substrate, indicated at 72, is utilized. The arrangement of elements, or layer of elements, is disposed on a curved surface of a substrate. The non-exposed surface 73 of the substrate may be curved, as shown, or may be planar. In addition, a quarter wave plate 74 is utilized as the polarization reorientation device and disposed in the source light beam such that the source beam 22 passes through it before reaching the layer 72, and such that the reflected beam 26 passes through it both before and after the recapture optic 76. It should be noted that the recapture optic 76 can also simultaneously be used to fill the function of the reflector 46 in FIGS. 4 and 5. The two surfaces of the optic 76 can be given different curvatures for this purpose. One surface of the recapture optic 76 serves as a reflector for the light source 23 while the other surface serves as the recapture optic. Thus, although the surfaces are formed on different sides of the same structural member, the recapture optic 76 is separate from the light source 23 because the reflected beam 26 is not directed back into the element 42.

The source beam 22 passes through the quarter-wave plate 74 and encounters the layer of elements 72. As above, polarization X of the source beam 22 is passed through the elements 72, defining the passed beam 24, because polarization X is orthogonal to the arrangement elements. Polarization Y of the source beam 22 is reflected off the elements 72, defining the reflected beam 26. Because the layer of element 72 is curved, the reflected beam 26 is reflected in a manner analogous to that expected from a concave mirror and is directed and focused on the recapture optic 76, which in this case is a convex mirror. Before reaching the recapture optic 76, the reflected beam 26 passes through the quarter-wave plate 74, which converts the polarization Y into an elliptical polarization, indicated by E. Elliptical polarization E means that the beam 26 now contains both X and Y components with a phase delay between them such that the polarization vector rotates in space as a function of time. The recapture optic 76 reflects and recollimates the reflected beam 26 of elliptical polarization E back towards the arrangement of elements. Upon reflection from the recapture optic 76, the elliptical polarization E has its handedness reversed, or direction of rotation reversed. The reflected beam 26 again passes through the quarter-wave plate 74 and the elliptical polarization E is converted into polarization X, which subsequently passes through the arrangement of elements 72.

Figure 7:
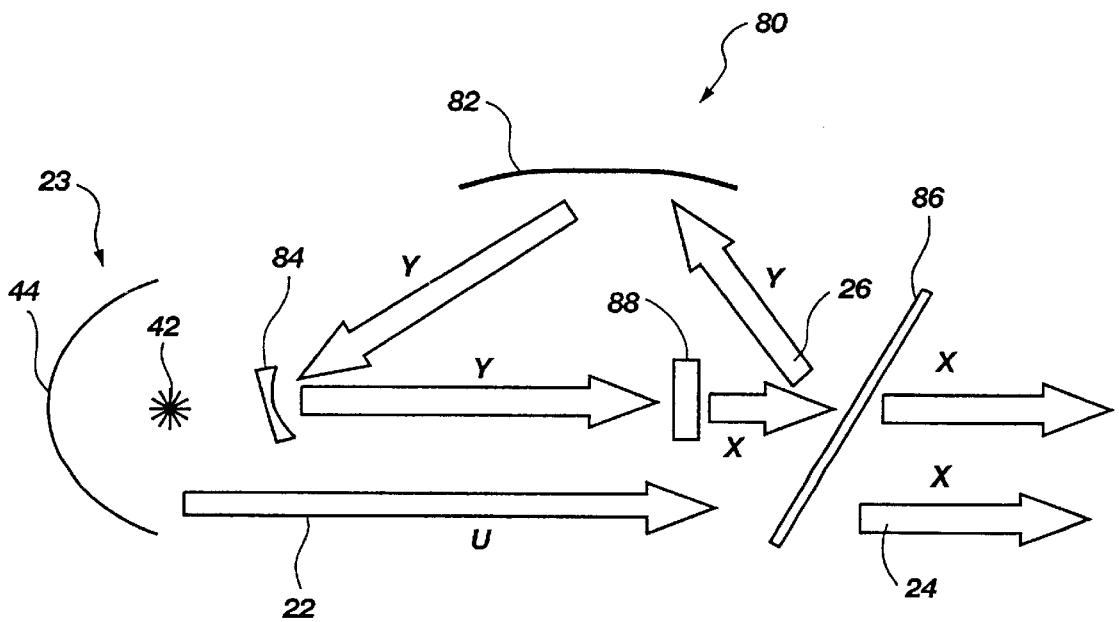
FIG. 7 is a schematic view of the general operation of an alternative embodiment of the polarizer apparatus of the present invention.

As illustrated in FIG. 7, the general operation of an alternative embodiment of a polarization device 80 of the present invention is shown in which the recapture optic comprises a plurality of optical elements 82 and 84. In addition, the layer of elements 86 is disposed in the source light beam at an oblique angle with respect to the source light beam 22. In other words, the arrangement of elements 86 is tilted with respect to an optical axis of the source light beam in order to direct the reflected beam 26 as desired. In this case, the reflected beam is directed towards a recapture optic 82, such as a concave mirror, designed to reflect and focus the reflected beam 26 towards another recapture optic 84, such as a concave mirror, to reflect and collimate the reflected beam 26.

The source beam 22 is directed at the tilted polarizer device 86, or arrangement of elements. Because the layer of elements 86 is tilted with respect to the optical axis, the reflected beam 26 is reflected in a manner analogous to that expected from a mirror and is directed towards the recapture optics 82 and 84 as described above. After reflecting from the recapture optics 82 and 84, the reflected beam 26 passes through the polarization reorientation device 88, such as a half wave plate. The reflected beam 26 subsequently passes through the arrangement of elements 86.

Figure 8:
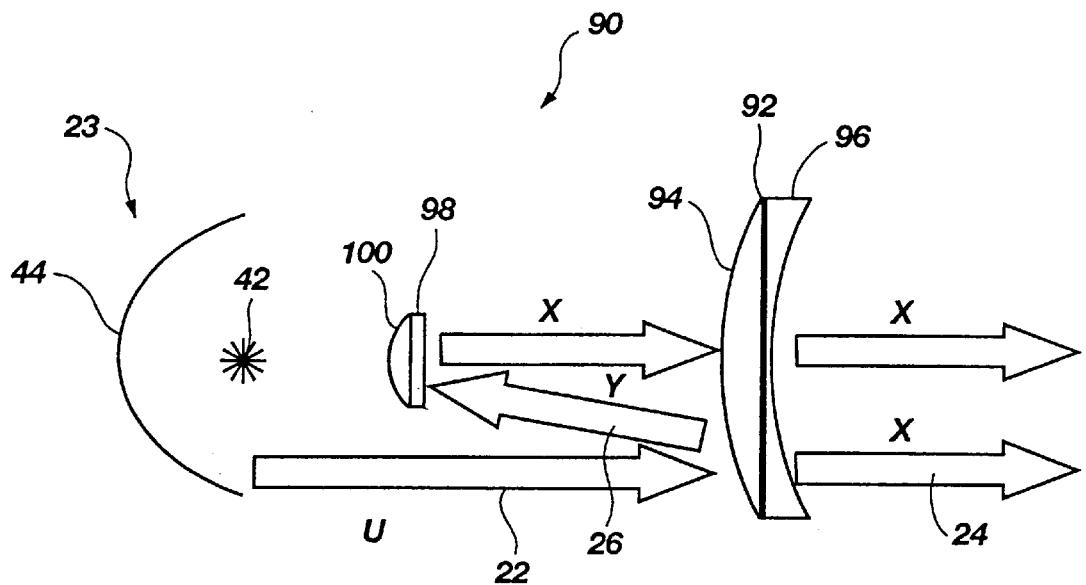
FIG. 8 is a schematic view of the general operation of an alternative embodiment of the polarizer apparatus of the present invention.

As illustrated in FIG. 8, the general operation of an alternative embodiment of a polarization apparatus 90 of the present invention is shown in which the arrangement of elements 92 is combined with a refractive optic, in particular a lens, to form a device that exhibits optical properties similar to a curved or figured arrangement of elements, but is less difficult and less expensive to manufacture. In addition to combining the arrangement of elements with optical elements, the arrangement of elements may be embedded within, or disposed between, the optical elements. In this case, the arrangement of elements 92 is disposed between, or embedded within, a plano-convex lens 94 and a plano-concave lens 96. The arrangement of elements, or layer of elements, may be disposed on a planar surface of either the plano-convex or plano-concave lens, the other surface of either lens being curved.

The source beam 22 is directed at the arrangement of polarizer elements 92 and optical elements 94 and 96. The illustrated lenses 94 and 96 are designed so that their net optical power is zero; however, other desired values may be selected. If their net optical power is zero, the transmitted beam will pass through the lenses 94 and 96 and the arrangement of elements 92 without significant alteration. Because of the plano-convex lens 94, the reflected beam 26 is reflected and refracted in a manner analogous to that expected from a double convex lens of approximately twice the optical power. The reflected beam 26 is focused on a polarization reorientation device 98, such as a quarter-wave plate, and a recapture optic 100, such as a mirror designed to reflect and collimate the reflected light beam. The reflected beam 26 subsequently passes through the arrangement of elements 92 and lenses 94 and 96.

The arrangement of elements 92 may be embedded between the lenses 94 and 96 for protection. In addition, the optical power of the lenses 94 and 96 may be designed so that the net effect of the lenses is to create a diverging or converging beam of polarized light, rather than a collimated beam. Furthermore, the polarization reorientation device 98 and recapture optic 100 may be combined, such as by silvering the convex surface of a plano-convex lens having the proper optical phase retardation or by cementing a quarter-wave plate to the planar surface of a plano-convex lens and silvering the convex surface.

Figure 9:
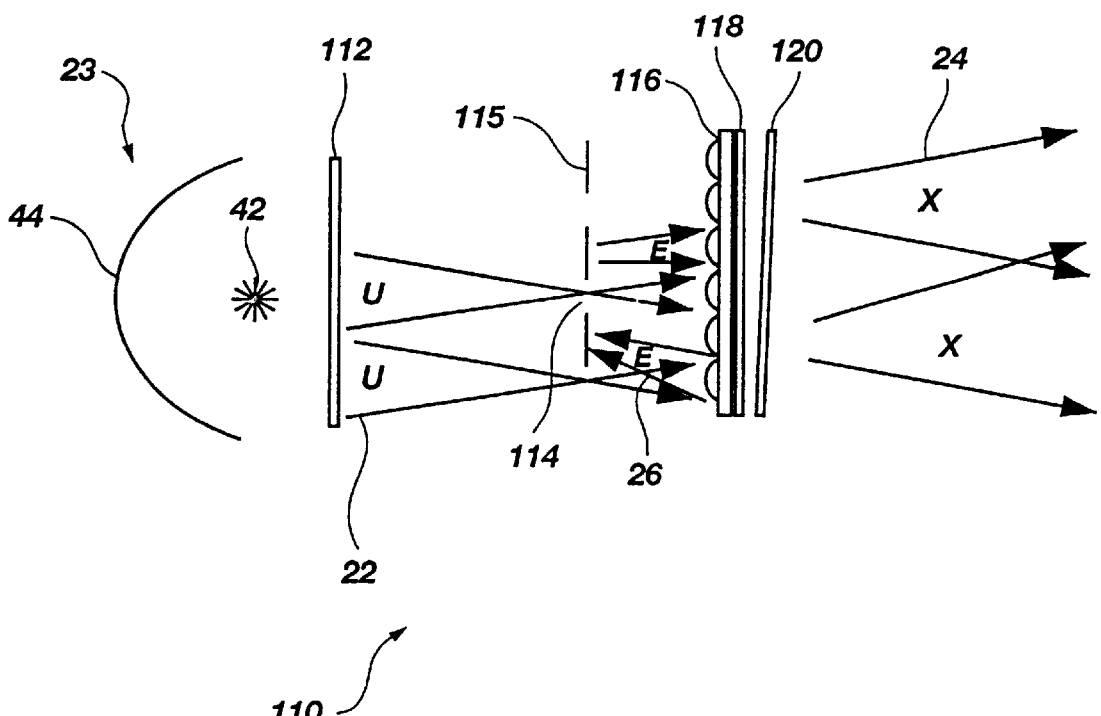
FIG. 9 is a schematic view of the general operation of an alternative embodiment of the polarizer apparatus of the present invention.

As illustrated in FIG. 9, the general operation of an alternative embodiment of a polarization apparatus 110 of the present invention is shown that is particularly well suited for use with an image projection system. The source light beam first passes through a first lens array 112 for creating multiple images of the source light beam that are focused at a plurality of holes 114 in a segmented mirror 115. The source light beam 22 then encounters a second lens array 116 and a polarization reorientation device 118, such as a quarter-wave plate. An arrangement of elements 120 is disposed in the optical path with a slight tilt with respect to the optical axis. Thus, the reflected beam 26 is directed towards the mirrored portions of the segmented mirror 115. The reflected beam 26 has a second polarization Y that is immediately converted to elliptical polarization E by the quarter-wave plate 118. The second lens array 116 causes the reflected beam 26 to be focused on mirrored portions of the segmented mirror 115.

Because the arrangement of elements 120 is tilted, the reflected beam 26 is directed towards the mirrored portions of the segmented mirror 115 rather than the holes 114. The mirror 115 reflects the reflected beam 26 back through the quarter-wave plate 118 and its polarization is changed to the first polarization X, which subsequently passes through the arrangement of elements 120.

Figure 10:
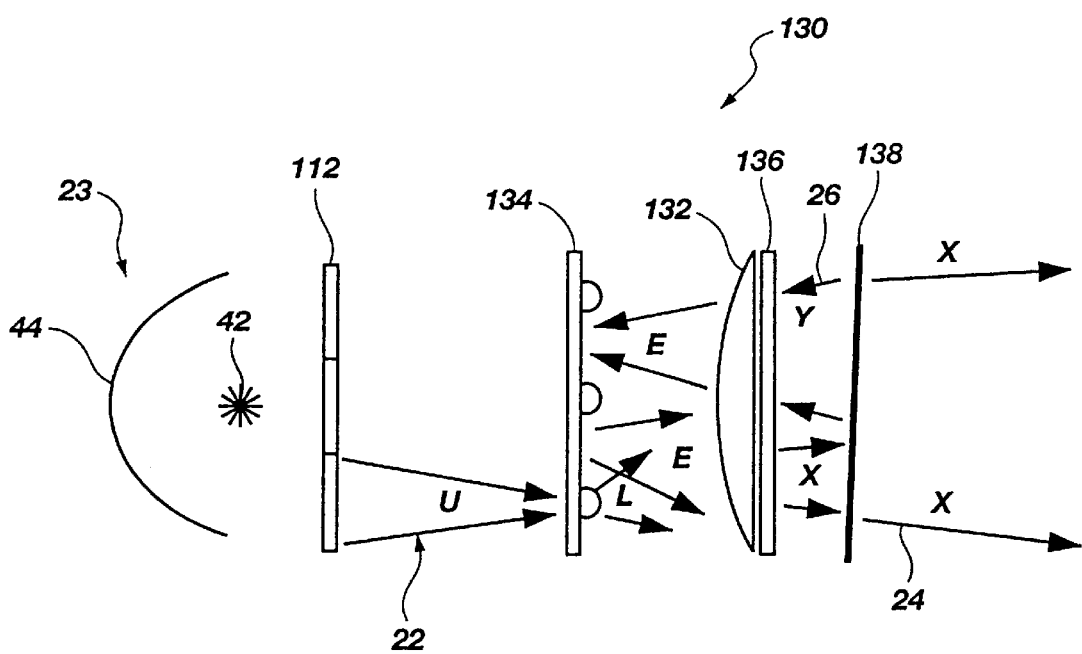
FIG. 10 is a schematic view of the general operation of an alternative embodiment of the polarizer apparatus of the present invention.

As illustrated in FIG. 10, the general operation of an alternative embodiment of a polarization device 130 of the present invention is shown that is particularly well suited for use with an image projection system with a field lens 132. This embodiment is similar to that illustrated in FIG. 9, except that the functions of the segmented mirror and third lens array have been combined and the function of the second lens array has been incorporated into the field lens 132. Again, the first lens array 112 creates a plurality of images of the source light beam and focuses them as a planar array of points at a second lens array 134, which spreads these images over the aperture of the field lens 132. The field lens 132 collimates the light before it passes to a polarization reorientation device 136, such as a quarter-wave plate. An arrangement of elements 138 is again tilted slightly with respect to the optical axis to direct the reflected beam 26 back to the second lens array 134. The lens array 134 has silvered portions to reflect the reflected beam back through the field lens. As the reflected beam 26 passes through the field lens 132, it focuses the reflected beam 26 into a copy of the original images generated by the first lens array 112. Because the arrangement of elements 138 is tilted, these copy images are displaced from the first images in the spaces between the first images.

Figure 11:
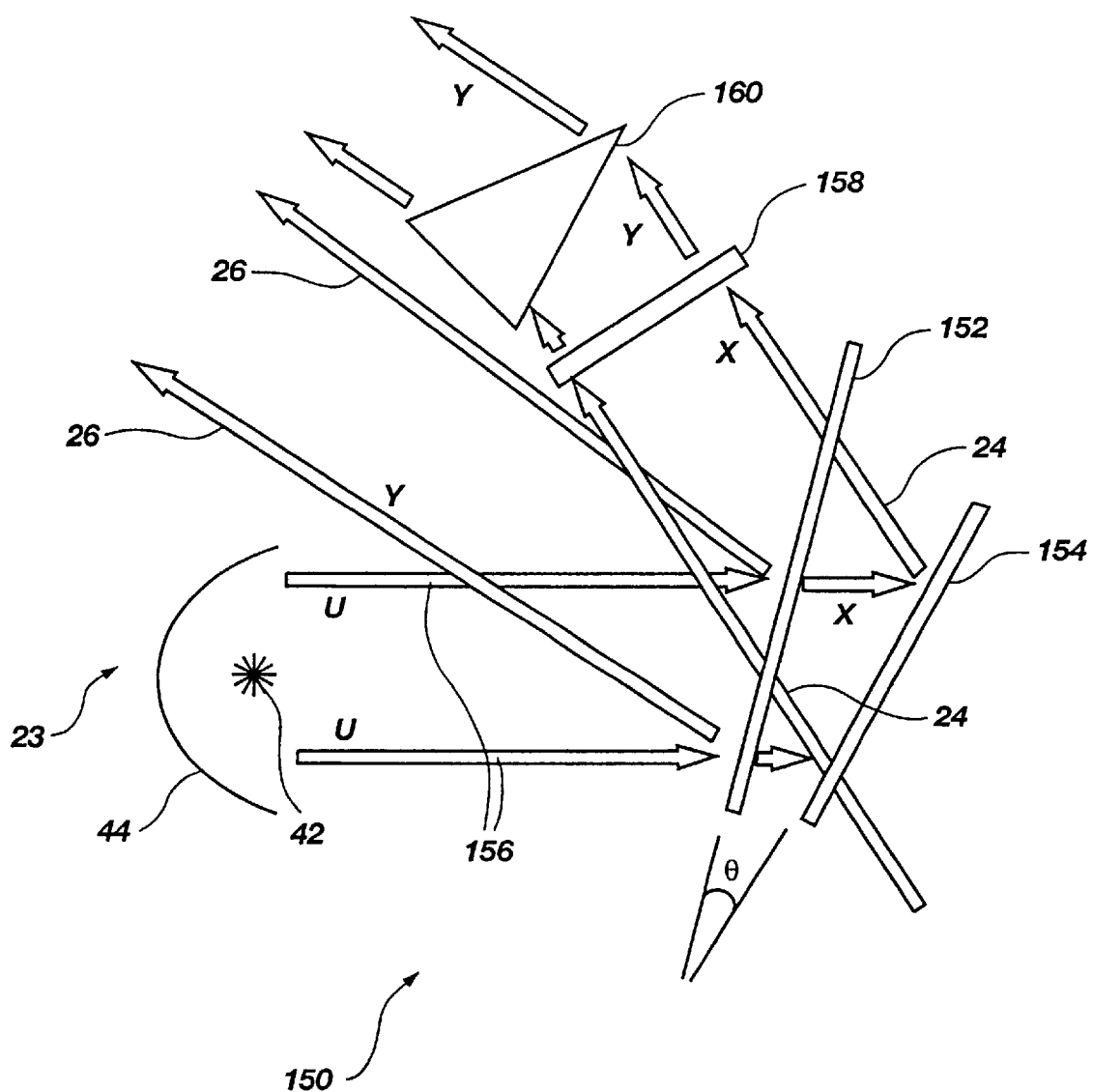
FIG. 11 is a schematic view of the general operation of an alternative embodiment of the polarizer apparatus of the present invention.

As illustrated in FIG. 11, the general operation of an alternative embodiment of a polarization apparatus 150 of the present invention is shown in which a generally planar configuration of elongated elements 152 is utilized. The arrangement of elements could be disposed on or within on optical element, such as a lens, if desired. The arrangement of elements 152 is placed in front of a plane mirror 154 with an angle θ between them. The mirror 154 and arrangement of elements 152 are placed in a generally collimated, unpolarized beam of light 156 at an angle to the propagation vector of the beam of light 156. The unpolarized nature of the light beam is indicated by U. This beam of light 156 could be produced by the combination of a light source 42 and a reflector 44, as shown, though other optical configurations known in the art could be used as well.

The mirror 154 and arrangement of elements 152 act upon the beam of light 156 in the following manner. The arrangement of elements 152 separates the beam 156 into two beams, a transmitted beam 24 of polarization X and a reflected beam 26 of polarization Y. The arrangement of elements 152 is placed within the source light beam 156 so that the reflected beam 26 of polarization Y is directed substantially as desired. The transmitted beam 24 of polarization X is reflected from the mirror 154 in a different direction than the reflected beam 26 so that as the two polarization polarized beams 24 and 26 propagate in space they will become physically separated. At a point where this physical separation is sufficient in size and position, a polarization rotation device 158, such as a wave-plate, is positioned to rotate the polarization vector of the transmitted beam 24, which is of polarization X, so that its polarization vector becomes aligned with that of the reflected beam 26, which is of polarization Y.

The passed beam 24, which is propagating in a different direction than that of the reflected beam 26, can also be directed at this point so that it is traveling in the same direction as the reflected beam 26. A prism 160 may be used to redirect the transmitted beam 24, but other means also may be used. The transmitted beam 24 also may be superimposed with the reflected beam 26 at some common area, or redirected in another optically useful direction.

It is of course understood that the order in which the transmitted beam 24 encounters the polarization reorientation device 158 and the prism 160 may be interchanged. In addition, the polarization reorientation device 158 may be placed in the reflected beam 26 to rotated the polarization vector of the reflected beam 26 from polarization Y so that it is aligned with the transmitted beam 24 of polarization X. Furthermore, the prism 160 and polarization reorientation device 158 each may be disposed in one of the beams 24 or 26 so that one beam has the propagation vector redirected and the other has the polarization vector rotated.

The various embodiments of the polarizer apparatus described above may be optically coupled with other components, such as image projection components, light projection components, or image display components, to operate as a desired system, such as an image projection system, a light projection system, or an image display system.

As illustrated by the several embodiments described and illustrated above, many different arrangements of the optical train and the optical elements are available. The above embodiments also illustrate the flexibility provided by the polarizer device and apparatus of the present invention. The reflected and/or transmitted beams may be directed and focused as desired by the polarizer device itself. In addition, the position of the polarizer device permits design flexibility for the location and orientation of the optical train and/or the configuration of the optical elements.

It should be understood that the described embodiments of the present invention can take many forms. For example, the described embodiments may be more general than the prior art wire grid polarizers and should not be construed to be limited to these types of polarizers only. For example, the prior art wire grid polarizer does not envision a distribution of generally parallel elements that defines a shape other than a plane, or in which the distribution may have a plurality of layers rather than a single layer, or in which the distribution may vary with thickness, or with location across the surface, in a controlled manner in order to obtain some advantage in performance or manufacturing.

It is to be understood that the described embodiments of the invention are illustrative only, and that modifications thereof may occur to those skilled in the art. For example, while no examples are specifically given in which the reflected polarization is returned to the light source and allowed to be reabsorbed or otherwise interact with the light source, it is obvious from the described embodiments that this is possible. Doubtless, some efficiencies or other advantages can be gained under certain circumstances if this is allowed to occur. Other alterations will surely occur to those skilled in the art given the significant increase in design flexibility over the prior art that is achieved by the present invention. Accordingly, this invention is not to be regarded as limited to the embodiments disclosed, but is to be limited only as defined by the appended claims herein.

What is claimed is:

1. A polarizer device adapted for physically decoupling two orthogonal polarizations of a source light beam into two generally polarized beams and further treating at least one of the two beams, the device comprising:

a substrate comprising a single element configured for disposition in the source light beam and having a first generally planar surface and a second generally curved surface opposite the first surface;

a generally parallel arrangement of thin, elongated elements configured for disposition on the first generally planar surface of the substrate, the elements having a pitch less than approximately 0.4 micrometers, and a width and length sized to interact with the electromagnetic waves of the source light beam to generally (i) transmit light having a polarization oriented perpendicular to the length of the elements and defining a transmitted beam, and (ii) reflect light having a polarization oriented parallel with the length of the elements and defining a reflected beam, thereby providing two generally polarized beams;

a light recapture means physically positioned in a different location from a light source and configured for disposition in the reflected beam for intercepting and redirecting the reflected beam so that the reflected beam is not directed back into the light source; and a polarization reorientation means configured for disposition in the reflected beam for changing the polarization orientation of substantially all the reflected beam so that both the reflected and transmitted beams have generally the same polarization, thereby substantially converting all the source light beam to a single polarization.

2. The polarizer device of claim 1, wherein the curved layer is parabolic.

3. The polarizer device of claim 1, wherein the curved layer is elliptical.

4. The polarizer device of claim 1, wherein the curved layer is cylindrical.

5. The polarizer device of claim 1, wherein the curved layer is spherical.

6. The polarizer device of claim 1, wherein the substrate is a lens.

7. The polarizer device of claim 1, wherein the substrate is a prism.

8. The polarizer device of claim 1, wherein the arrangement of elements is disposed on the first surface of the substrate and the second surface of the substrate.

9. The polarizer device of claim 1, wherein the arrangement of elements may be oriented with respect to the source light beam at substantially any incidence angle.

10. The polarizer device of claim 1, wherein the elements are equally spaced.

11. The polarizer device of claim 1, wherein the elements have a pitch of less than approximately 0.13 micrometers.

12. The polarizer device of claim 1, wherein the elements have a width and a pitch, and wherein the ratio of the width to pitch is approximately 40% to 60%.

13. The polarizer device of claim 1, wherein the elements have a length generally greater than approximately 0.7 micrometers.

14. The polarizer device of claim 1, wherein the elements have a pitch and a width generally between 90% to 10% of the pitch.

15. The polarizer device of claim 1, wherein the light recapture means comprises at least two optical elements.

16. The polarizer device of claim 1, wherein the light recapture means includes means for redirecting the at least one beam so that both the reflected and transmitted beams are parallel to one another.

17. The polarizer device of claim 16, wherein the reflected and transmitted beams have portions which are substantially collinear.

18. The polarizer device of claim 16, wherein the reflected and transmitted beams have generally the same divergence.

19. The polarizer device of claim 1, further comprising image projection components optically coupled to the polarizer device and operable as an image projection system.

20. The polarizer device of claim 1, further comprising light projection components optically coupled to the polarizer device and operable as a light projection system.

21. The polarizer device of claim 1, further comprising image display components optically coupled to the polarizer device and operable as an image display system.

22. A polarizer apparatus adapted for physically decoupling two orthogonal polarizations of a source light beam into two generally polarized beams and further treating at least one of the two beams, the device comprising:

a substrate comprising a single optical element configured for disposition in the source light beam and having a first generally planar surface and a second generally curved surface opposite the first surface;

a generally parallel arrangement of thin, elongated elements configured for disposition on the first generally planar surface of the substrate, the elements having a pitch less than approximately 0.13 micrometers, and a width and length sized to interact with the electromagnetic waves of the source light beam to generally (i) transmit light having a polarization oriented perpendicular to the length of the elements and defining a transmitted beam, and (ii) reflect light having a polarization oriented parallel with the length of the elements and defining a reflected beam, thereby providing two generally polarized beams;

a light recapture means physically positioned in a different location from a light source and configured for disposition in the reflected beam for intercepting and redirecting the reflected beam so that the reflected beam is not directed back into the light source; and a polarization reorientation means configured for disposition in the reflected beam for changing the polarization orientation of substantially all the reflected beam so that both the reflected and transmitted beams have generally the same polarization, thereby substantially converting all the source light beam to a single polarization.

23. A polarizer device adapted for physically decoupling two orthogonal polarizations of a source light beam into two generally polarized beams and further treating at least one of the two beams, the device comprising:

a substrate comprising a single optical element configured for disposition in the source light beam and having a first generally planar surface and a second generally curved surface opposite the first surface;

a generally parallel arrangement of thin, elongated elements configured for disposition on the first generally planar surface of the substrate, the elements having a length, a pitch, and width generally between 90% to 10% of the pitch, the width and length being sized to interact with the electromagnetic waves of the source light beam to generally (i) transmit light having a polarization oriented perpendicular to the length of the elements and defining a transmitted beam, and (ii) reflect light having a polarization oriented parallel with the length of the elements and defining a reflected beam, thereby providing two generally polarized beams;

a light recapture means physically positioned in a different location from a light source and configured for disposition in the reflected beam for intercepting and redirecting the reflected beam so that the reflected beam is not directed back into the light source; and a polarization reorientation means configured for disposition in the reflected beam for changing the polarization orientation of substantially all the reflected beam so that both the reflected and transmitted beams have generally the same polarization, thereby substantially converting all the source light beam to a single polarization.

* * * * *